(12) United States Patent
Forest

(10) Patent No.: US 12,375,875 B2
(45) Date of Patent: Jul. 29, 2025

(54) PASSENGER LOCATION PLATFORM

(71) Applicant: GOGO BUSINESS AVIATION LLC, Broomfield, CO (US)

(72) Inventor: Francis Forest, Peachtree Corners, GA (US)

(73) Assignee: GOGO BUSINESS AVIATION LLC, Broomfield, CO (US)

(*) Notice: Subject to any disclaimer, the term of this patent is extended or adjusted under 35 U.S.C. 154(b) by 0 days.

(21) Appl. No.: 18/214,155

(22) Filed: Jun. 26, 2023

(65) Prior Publication Data
US 2023/0336943 A1 Oct. 19, 2023

Related U.S. Application Data

(63) Continuation of application No. 16/200,920, filed on Nov. 27, 2018, now Pat. No. 11,689,886.

(51) Int. Cl.
| | |
|---|---|
| *H04W 4/024* | (2018.01) |
| *B64D 11/06* | (2006.01) |
| *B64D 47/02* | (2006.01) |
| *G01C 21/20* | (2006.01) |

(52) U.S. Cl.
CPC ............ *H04W 4/024* (2018.02); *B64D 11/06* (2013.01); *B64D 47/02* (2013.01); *G01C 21/20* (2013.01)

(58) Field of Classification Search
CPC ....... H04W 4/024; B64D 11/06; B64D 47/02; G01C 21/20
See application file for complete search history.

(56) References Cited

U.S. PATENT DOCUMENTS

| | | | |
|---|---|---|---|
| 5,921,670 A | 7/1999 | Schumacher et al. | |
| 7,178,954 B2 | 2/2007 | Blechschmidt | |
| 9,380,428 B1 | 6/2016 | Dame et al. | |
| 11,689,886 B2* | 6/2023 | Forest | B64D 11/0015 |
| | | | 701/522 |

(Continued)

FOREIGN PATENT DOCUMENTS

| | | | |
|---|---|---|---|
| DE | 102010033624 A1 * | 2/2012 | ............ B60N 2/002 |
| JP | 2001301698 A | 10/2001 | |

(Continued)

OTHER PUBLICATIONS

God et al., Drahtlose kommunikation in der flugzeugkabine fur effiziente arbeitsablaufe und passagierdienstleistungen, MKWI 2010 Multikonferenz Wirtschaftsinformatik, Feb. 23-25, 2010, 14 pp.

(Continued)

*Primary Examiner* — Andrew J Cromer
(74) *Attorney, Agent, or Firm* — Holland & Hart LLP

(57) ABSTRACT

Systems and methods are described to provide navigational guidance to persons within crowded and unfamiliar environments such as aircraft cabins, stadiums, and theaters. An "activation arrangement" may be created to dynamically activate various lighting devices, personal electronic devices, and/or other devices to usher the person from a current location to a destination, such as a seat, entranceway, or lavatory. These techniques may be customized based upon existing conditions within the environment and/or based upon user-personalized settings to improve the comfort of persons in these environments.

20 Claims, 14 Drawing Sheets

(56) References Cited

U.S. PATENT DOCUMENTS

| | | | |
|---|---|---|---|
| 2001/0023908 A1 | 9/2001 | Romca et al. | |
| 2011/0010135 A1* | 1/2011 | Boin .................... | B64D 11/06 |
| | | | 703/1 |
| 2012/0253658 A1 | 10/2012 | Kappeler et al. | |
| 2014/0085337 A1* | 3/2014 | Velten .................... | G09G 5/14 |
| | | | 345/635 |
| 2014/0309924 A1 | 10/2014 | Varoglu et al. | |
| 2015/0015024 A1* | 1/2015 | Cremers ............. | G09B 21/008 |
| | | | 296/178 |
| 2017/0200355 A1* | 7/2017 | Gruenbaum .......... | B61D 41/00 |

FOREIGN PATENT DOCUMENTS

| | | |
|---|---|---|
| WO | WO-2008/043877 A1 | 4/2008 |
| WO | WO-2018/164710 A1 | 9/2018 |

OTHER PUBLICATIONS

International Application No. PCT/US2019/061300, International Search Report and Written Opinion, mailed Mar. 13, 2020.
European Patent Application No. 19817490.6, Communication pursuant to Article 94(3) EPC, dated Feb. 17, 2023.

* cited by examiner

PASSENGER LOCATION PLATFORM

CROSS-REFERENCE TO RELATED APPLICATIONS

This application is a continuation application claiming priority to and the benefit of the filing date of U.S. patent application Ser. No. 16/200,920, filed Nov. 27, 2018 and entitled "PASSENGER LOCATION PLATFORM," the entirety of which is incorporated herein by reference.

FIELD

The present disclosure generally relates to wireless communication systems. More particularly, the present disclosure describes techniques for leveraging the technological capabilities of various devices to provide navigation aid to a person moving about a navigable environment such as an aircraft cabin.

BACKGROUND

A cabin of an aircraft, particularly a commercial aircraft, is typically a crowded environment carrying a large number of passengers and crew members. Within this crowded and often unfamiliar environment, a passenger or crew member may need to navigate the cabin to access a location such a passenger's seat, an entranceway, a lavatory, or an overhead storage compartment. However, the crowded, unfamiliar, and often dimly lit conditions of the aircraft cabin may impede movement around the aircraft cabin.

Typically, a passenger or crew member in an aircraft cabin may carry a personal wireless electronic device, such as a smartphone. Some existing applications enable passengers to use a personal device to view an electronic boarding pass, which may indicate the passenger's seat number. However, these existing applications do not provide further navigation aid to the seat or to other areas of the cabin, nor do these applications mitigate the above-described inconveniences associated with the cabin environment.

SUMMARY

The disclosure of the present application describes computing systems and methods for providing navigation aid to one or more persons moving about a "navigable physical environment" such as an aircraft cabin, stadium, theater, or auditorium. In example embodiments for navigation aid in an aircraft cabin environment, the techniques described herein may provide visual, audial, and/or haptic navigation aid by leveraging the technological capabilities of (1) lighting/display devices installed within the aircraft cabin environment, and/or (2) wireless communication devices (e.g., smartphones) carried aboard the aircraft by passengers and crew members. The techniques described herein may thereby mitigate inconveniences often encountered by persons moving about the navigable environment. Furthermore, in some scenarios, these techniques may provide locations of passengers, seats, lavatories, and other locations, where in an unfamiliar environment the locations may otherwise be unknown.

Generally, the navigation aid techniques herein may be implemented via one or more computing devices disposed within the navigable environment. For example, in the aircraft cabin environment, one or more on-board servers may be physically disposed within the cabin, or may be otherwise operatively connected to various lighting devices and other electronic devices within the aircraft cabin (e.g., via Air-To-Ground (ATG) and/or satellite communications links). In response to receiving an indication of a person intending to move about the navigable environment ("navigation intent"), a current location of the person and a destination may be determined. An ad hoc "activation arrangement" may be assembled, the activation arrangement including a determination one or more "aid devices" to be activated in a particular manner to guide the person from the current location to the destination. The activation arrangement may be executed, causing the one or more aid devices to activate as determined to guide the person to the destination.

In an embodiment, a computer-implemented method provides visual aid to a person within a navigable environment such as an aircraft cabin. The method includes, via one or more processors: (1) receiving, via a computing device disposed within the navigable environment, an indication of an intent of a person to navigate within the navigable environment, (2) determining a current location of the person within the navigable environment, (3) determining, based upon the received indication of the navigation intent, a destination of the person within the navigable environment, (4) determining, based upon the determination of the current location and destination, an activation arrangement comprising a determination of one or more visual aid devices to be activated within the navigable environment to guide the person from the current location to the destination, and/or (5) causing activation of the one or more visual aid devices according to the activation arrangement. The method may include additional, fewer, or alternate actions, in some embodiments.

In another embodiment, a computing system may provide visual aid to a person within a navigable environment. The computing system may include one or more processors and one or more computer memories storing computer-executable instructions that, when executed via the one or more processors, cause the computing system to (1) receive, via a computing device disposed within the navigable environment, an indication of an intent of a person to navigate within the navigable environment, (2) determine a current location of the person within the navigable environment, (3) determine, based upon the received indication of the navigation intent, a destination of the person within the navigable environment, (4) determine, based upon the determination of the current location and destination, an activation arrangement comprising one or more visual aid devices to be activated within the navigable environment to guide the person from the current location to the destination, and/or (5) cause the one or more visual aid devices to activate according to the activation arrangement. The computing system may include additional, fewer, or alternate components, and may be configured to perform additional, fewer, or alternate actions, in some embodiments.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
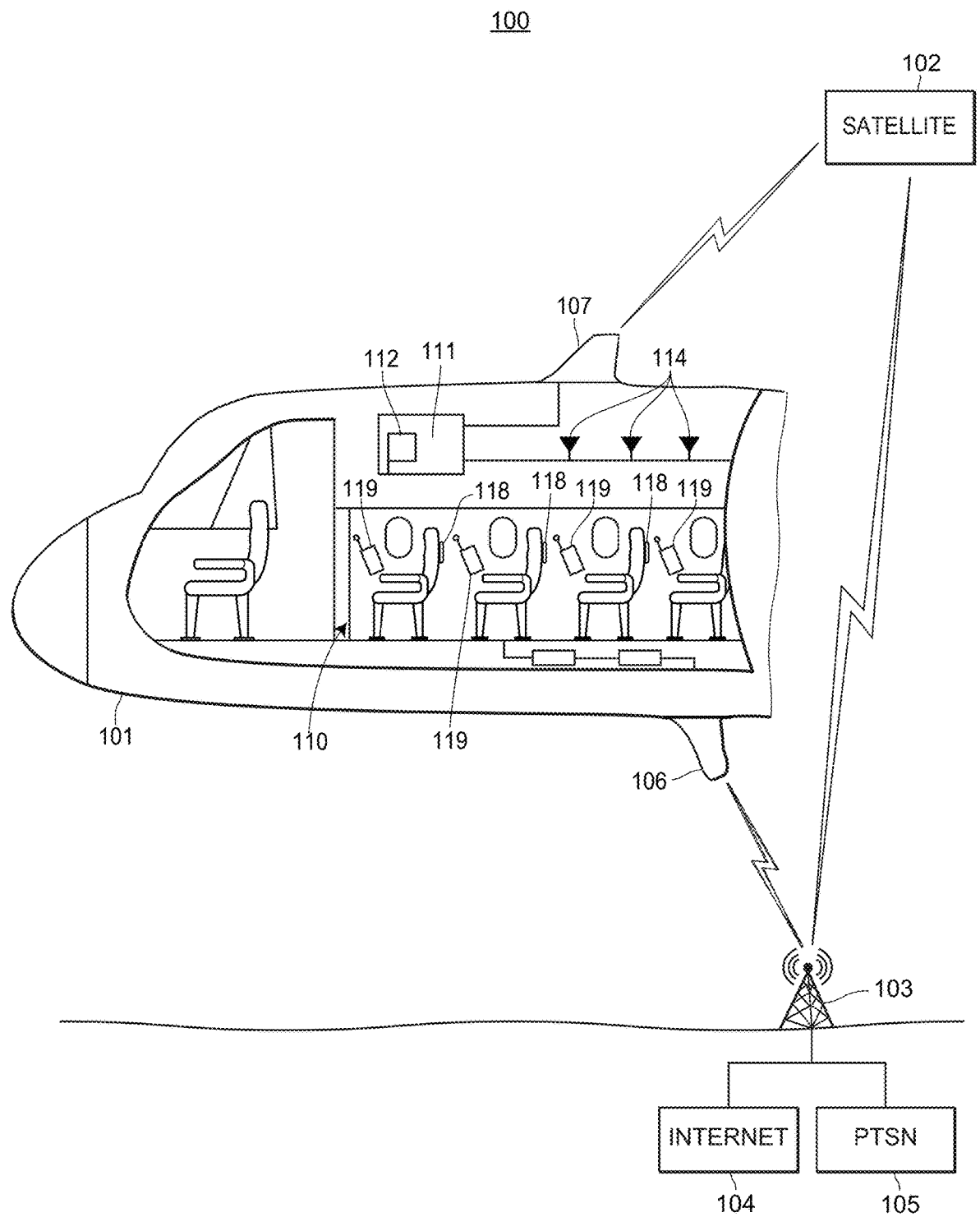
FIG. 1 depicts an example aircraft communication environment in which the techniques described herein be implemented.

At a high level, the disclosure of the present application describes methods and a computing platform for providing navigation aid to persons moving about a "navigable physical environment" such as an aircraft cabin environment. Particularly, in example aircraft cabin environments that will be described herein, these techniques may provide navigation aid to passengers and/or crew members via visual, audial, and/or haptic activation of various "navigation aid devices" devices in the within and/or proximal to the cabin. These navigation aid devices may include, but are not limited to, (1) lighting devices including aisle lighting devices, overhead lighting devices, and/or public display screens, (2) seatback computing units provided at seats of passengers, and/or (3) personal wireless communication devices ("personal devices," e.g., smartphones) carried aboard the aircraft by passengers and/or crew members. "Activating" one or more such devices may include causing each device to provide various visual, audial, and/or haptic prompts/alerts to the person such that they may easily navigate to a destination within or near the aircraft cabin. For any person intending to navigate about the aircraft cabin environment, an ad hoc "activation arrangement" may be determined, execution of which may cause one or more aid devices activate according to various techniques described herein to guide the person from their current location to the destination.

In some embodiments, the techniques described herein may more particularly leverage the technological capabilities of personal devices carried by persons within a navigable environment. Location of such devices, and thus the corresponding persons within the navigable environment, may be determined via various location techniques, including wireless location techniques via wireless access points, RFID readers, iBeacons, and/or other near-field communication (NFC) devices. In some embodiments, locations of each person within a navigable environment may be monitored, such that (1) any person may receive navigation aid to any destination within the navigable environment, (2) navigation aid may be provided based upon location of such persons to avoid crowding in the navigable environment, and/or (3) other persons, such as seated passengers in an aircraft, may themselves receive timely notification that a navigating person is approaching/passing and "make way" to reduce inconvenience.

Generally, the techniques described herein may be implemented via one or more centrally disposed computing devices within the navigable environment. For example, in the aircraft cabin environment, as will be described herein, an on-board server may be physically placed in the aircraft cabin environment, and/or may be otherwise communicatively connected to the elements therein. The on-board server may be communicatively connected to lighting devices, seatback units, personal devices, and/or other devices via various communications links, examples of which will be provided herein.

An indication of a "navigation intent" of a person may be received, the indication of the navigation intent generally indicating a person's intent to move ("navigate") to another location ("destination") within the navigable environment. The indication of the navigation intent may comprise one or more signals received, for example, via a personal device, seatback unit, or other electronic device described herein. In response to receiving a navigation intent, a current location of the person and the destination may be determined.

In some scenarios, the received indication of the navigation intent may itself clearly indicate a current location of the person. For example, the indication of the navigation intent may be received via a fixedly installed computing device, such as a seatback unit fixedly mounted to a seat or wall in an aircraft cabin, the location of the person may generally correspond to the location of the device, record of which may be stored at the on-board server. In some scenarios, the current location of the person may be determined based upon a determined location of a personal device corresponding to the person. Examples of personal device location techniques will be provided herein.

In some scenarios, the received indication of the navigation intent may additionally or alternatively be indicative of the person's destination within the navigable environment. For example, the received indication of the navigation intent in the aircraft cabin environment may explicitly indicate an intent to find a "Seat 22E." In other scenarios, though, the received indication of the navigation intent may be less clearly indicative of the destination. For example, the received indication of the navigation intent may indicate the person seeking to "Return to My Seat" or "Find the Nearest Open Lavatory," without an explicit identification of a destination. The techniques described herein may leverage the technological capabilities of various electronic devices within the navigable environment to determine an exact destination and facilitate navigation thereto, even if the navigating person does not know or cannot explicitly indicate their exact destination.

In any case, based upon the determined current location and destination, an "activation arrangement" may be determined. Generally, the activation arrangement may include a determination of one or more navigation aid devices for activation in a particular manner to guide the person between the current location and the destination. The one or more navigation aid devices may include, for example, various lighting devices, public display screens, seatback units, personal devices, and/or other visual, audial, and/or haptic devices within the navigable environment. "Executing" an activation arrangement may include causing the one or more aid devices to "activate" according to the activation arrangement, that is, to operate in a particular manner (e.g., to visually display light, to play an audible sound, or to vibrate). An activation arrangement may more particularly comprise a determination of various "activation characteristics" according to which an aid devices may be activated. For example, determining an activation arrangement may include determining a lighting device to activate to display a particular color, color pattern, image, or brightness. Other examples of activation characteristics will be provided herein. Using these techniques, an activation arrangement may be determined based upon environmental conditions within the navigable environment (e.g., existing lighting levels), based upon personalized settings, and/or based upon other considerations described herein.

In some embodiments, execution of the activation arrangement may be based at least in part upon continuous determination and updating of the current location of the person within the navigable environment. For example, executing an activation arrangement may include causing a display screen to activate in response to a determination that the navigating person is within a predetermined threshold proximity of the display screen, as determined based upon a location of a personal device corresponding to the person. Timely activation of one or more navigation aid devices may further facilitate convenient navigation about the navigable environment.

Using the techniques described herein, multiple activation arrangements may potentially be determined and/or executed simultaneously within a same environment. For example, the techniques herein may provide simultaneous navigation aid for two or more people moving about a same aircraft cabin environment. As will be understood from this detailed description, the variety of available aid devices and activation characteristics may be leveraged to effectively distinguish any two or more activation arrangements, such that a person may clearly differentiate their own path to a destination.

In this detailed description, navigation aid techniques will generally be described with respect to example aircraft cabin environments. An aircraft cabin environment may include a communication environment (e.g., a wired Local Area Network (LAN) and/or a Wireless Local Area Network (WLAN)) that may communicatively interconnect one or more on-board servers (e.g., Airborne Control Processor Unit (ACPU)), one or more lighting devices, one or more seatback units, one or more personal devices, and/or other devices present in the cabin environment. Other terms used in this detailed description may correspond to the example aircraft cabin navigable environments. For example, persons seeking navigation guidance within the aircraft cabin environment may be described as "passengers" and "crew members" (e.g., pilots, flight attendants, etc.). Locations to and from which persons may receive navigation aid may include seats, lavatories, galleys, entranceways, cockpits, overhead storage compartments, etc. However, unless indicated otherwise, it should be understood that the navigation aid techniques described herein are not limited to use within aircraft cabin environments. In some embodiments, the navigation aid techniques described herein may provide navigation aid to persons navigating to and from locations within a train, bus, stadium, theater, arena, auditorium, office space, school, or other suitable environment. Corresponding modifications to computing devices and other elements described herein may be envisioned. For example, whereas an aircraft cabin environment may include one or more "on-board servers," a stadium or theater environment may alternatively include one or more computing devices operatively connected to various devices therein, and may be configured to facilitate the techniques described in this detailed description.

Example Aircraft and Cabin Environment

FIG. 1 depicts an example aircraft communication environment 100 in which the navigation aid techniques described herein may be implemented.

An aircraft 101 may be communicatively connected (via one or more satellite links via one or more satellites 102 and/or via one or more Air-to-Ground [ATG] links) to a ground base station 103 (e.g., one or more ground base stations). The base station 103 may facilitate unidirectional or bidirectional communications between the aircraft 101 and the Internet 104 and/or a Public Switched Telephone Network (PTSN) 105. The external communication link(s) between the aircraft 101 and the base station 103 may be enabled via one or more aircraft-mounted ATG antennas 106 and/or one or more aircraft-mounted satellite antennas 107. The external communication link(s) may correspond to one or more particular communication protocols (e.g., TDMA, GSM, CDMA, GSM, LTE, WiMAX, Wi-Fi, etc.) and/or to one or more particular frequency bands (e.g., $K_a$ band, $K_u$ band, L band, S band, Cellular band, AWS Band, PCS band, an unlicensed band, etc.).

The aircraft 101 may generally contain a communication architecture that establishes a Local Area Network (LAN) 110 (e.g., a wired and/or wireless LAN) within a cabin of the aircraft. The Local Area Network 110 may enable passengers and/or crew within an aircraft cabin to wirelessly register devices and/or users, download and access applications, consume media or other digital content/services via wireless local area network (WLAN) communication protocols.

The aircraft 101 may include an on-board server 111 (e.g., an Airborne Control Processor Unit (ACPU)), which may include one or more computing devices. The on-board server may include one or more non-transitory computer memories 112. The on-board server 111 may generally operate to establish and manage operations of the Local Area Network 110 within the aircraft 101, including provision of applications, data, media content, and the like, which may be stored via the one or more non-transitory computer memories 112.

The on-board server 111 may be coupled to one or more modems communicatively connected to the antenna(s) 106 and/or 107 to exchange unidirectional and/or bidirectional communications with the Internet 104 and/or PTSN 105 via the base station 103, thereby providing access to systems, nodes, and devices not located within the aircraft 101. That is, the on-board server 111 may determine that data transmitted by one or more computing devices on-board the aircraft 101 is addressed to a location external to the aircraft 101, and may route the data via the one or more modems to the base station 103 via one or more ATG communications links and/or satellite communications links. Conversely, the on-board server 111 may, via the one or more modems and antennas 106 and/or 107, receive data addressed to a location within the aircraft 101, and may route the data to the location within the aircraft.

One or more wireless access points 114 may be operatively connected (wiredly and/or wirelessly) to the on-board server 111. Although FIG. 1 depicts three wireless access points 114, it should be understood that the environment 100 may include additional or fewer wireless access points. The wireless access points 114 may operate according to one or more wireless local area network (WLAN) communication protocols, such as one or more IEEE 802.11 (Wi-Fi) protocols (e.g., 802.11b, 802.11g, 802.11ac, etc.) to support wireless communications among various devices within and/or proximal to the aircraft 101.

The on-board server 111 and/or wireless access point(s) 114 may facilitate communications with one or more seatback units 118. A seatback unit 118 may comprise one or more computing devices configured to provide Internet browsing capabilities, real-time media programming, and/or other services and applications that require access to remote content, or to locally stored content accessible via the on-board server 111. Generally, each of the one or more seatback units 118 may be affixed to a seatback or other surface within the aircraft 101 to provide the services/applications to a corresponding passenger, who may be seated behind the seatback or other surface to which the seatback unit 118 is affixed. The on-board server 111 may store data associating the one or more seatback units 118 to (1) one or more respective seats within the aircraft, and/or (2) one or more respective passengers to be seated therein.

The on-board server 111 and/or wireless access point(s) 114 may facilitate communications with one or more passenger personal devices 119. The one or more personal devices 119 may include, for example, smartphones, PDAs, tablet computing devices, laptop computing devices, and/or other personal computing devices carried on-board the aircraft 101 by passengers and/or crew members. Passengers and/or crew members may use respective personal devices 119 to access an Internet browser, consume media and other digital content, and/or access other services and applications that require access to remote content or locally stored content. The on-board server 111 may facilitate wireless registration, authentication, and/or authorization of the one or more personal devices 119 (e.g., device, application, and/or user registration/authentication/authorization) to access the services/content. The on-board server 111 may further store data associating the one or more personal devices 119 to particular passengers and/or crew members. In some embodiments, this data may be leveraged to determine a current location of a person within or proximal to the aircraft 101, based upon a detected location of a corresponding personal device 119.

In some embodiments, the on-board server 111 may control and/or monitor the operational status of one or more lighting devices within the aircraft 101. For example, the on-board server 111 may operate to control and/or monitor aisle lighting devices, overhead lighting devices, luminous signage, and/or other lighting devices fixedly mounted within the aircraft 101. Via the communicative connection(s) between the on-board server 111 and the one or more seatback units 118, one or more personal devices 119, other computing devices, and various lighting devices, the on-board server 111 may determine an activation arrangement of the devices and cause activation of the devices in accordance therewith.

In some embodiments, the aircraft 101 may further comprise one or more photosensors strategically placed configured to detect a general lighting level within the cabin of the aircraft 101, detect a lighting level within a particular portion of the cabin of the aircraft 101 (e.g., within a lavatory), and/or detect movement within the cabin of the aircraft 101. In these embodiments, the one or more photosensors may be communicatively connected to the on-board server 111 to facilitate at least some of the techniques described herein.

The environment 100 may include additional, fewer, or alternate elements, in some embodiments. While the aircraft 101 is described herein as being communicatively connected to the ground, it should be understood that, in some embodiments, some or all of the navigation aid techniques described herein may be implemented locally within the aircraft 101 (e.g., via the on-board server 111 and other devices in the aircraft 101), without requiring any exterior communication links.

Example Aircraft Cabin Environments

Figure 2A:
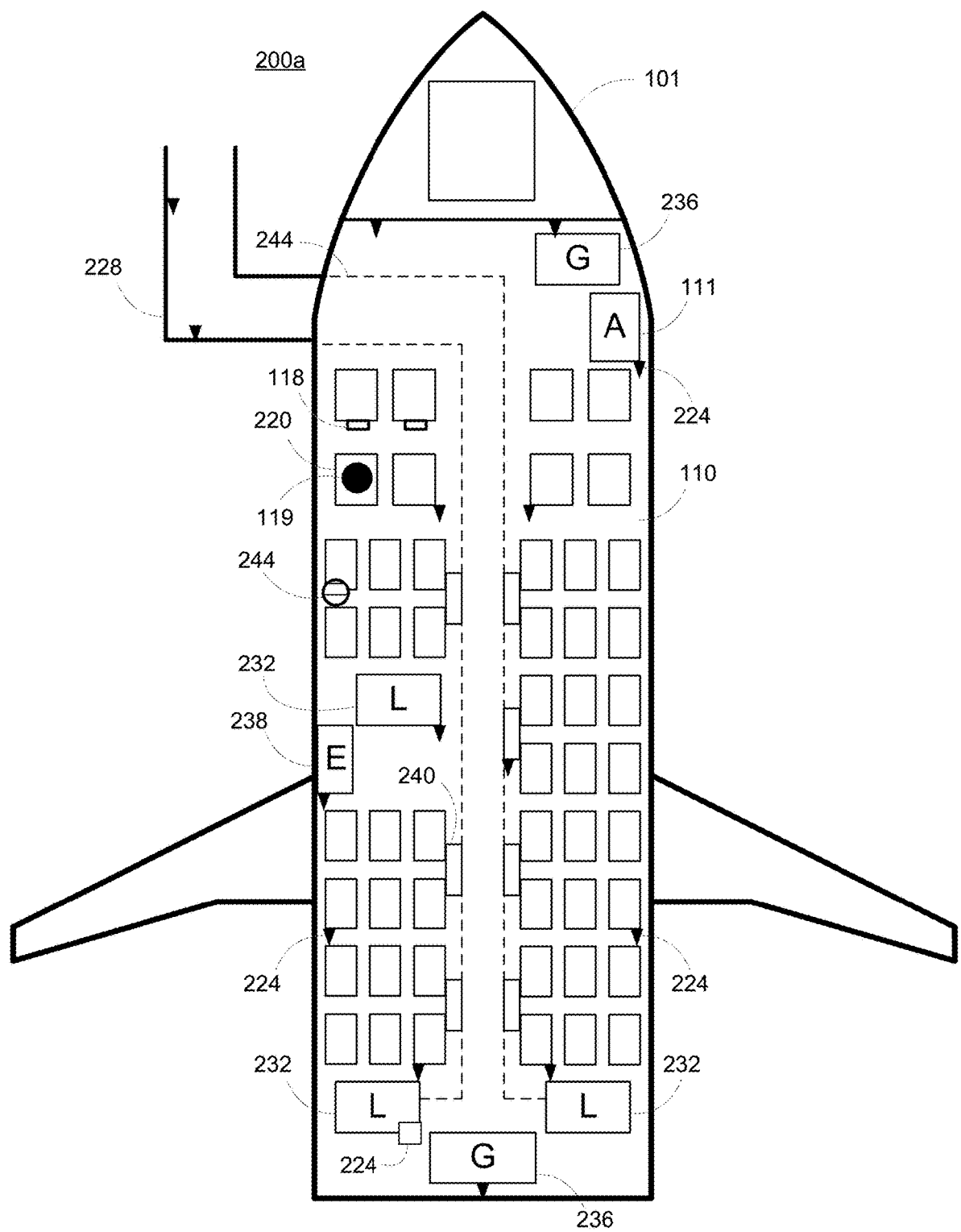
FIGS. 2A and 2B are overhead views of example aircraft cabin environments in which the techniques described herein may be implemented.
Figure 2B:
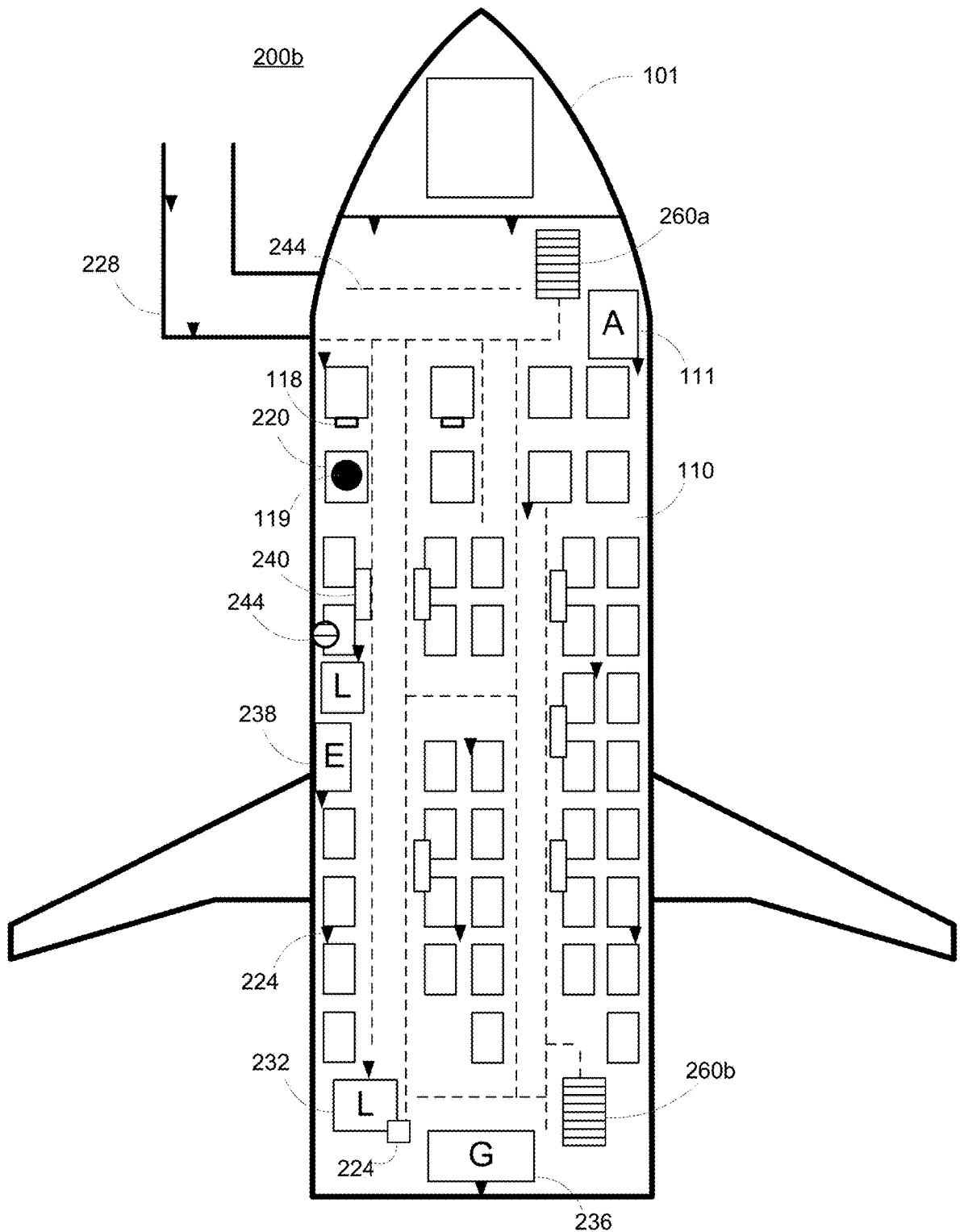

FIGS. 2A and 2B are overhead views of example aircraft cabin environments 200a and 200b in which navigation aid techniques may be implemented.

Description of the aircraft cabin environments 200a and 200b will generally focus on devices and locations within and physically proximal to the aircraft 101. It should be understood, though, that the elements within the aircraft cabin environments 200a and/or 200b may be operatively connected to other exterior elements via the techniques described with respect to FIG. 1. For example, in some embodiments, the on-board server 111 in the environments 200a and 200b may be communicatively connected to one or more base stations via one or more ATG and/or satellite communications links.

Referring first to FIG. 2A, the aircraft cabin environment 200a includes the aircraft 101, within the cabin of which the Local Area Network 110 may be provided. In embodiments where the aircraft 101 is on the ground (e.g., at a gate), the aircraft cabin environment 200a may be understood to further include physical areas proximal to the aircraft 101. For example, the cabin environment 200a may include an entranceway/exit (hereinafter simply "entranceway") 228 through which passengers and/or crew may enter the aircraft 101. Additionally or alternatively, when the aircraft 101 is on the ground, the aircraft cabin environment 200a may be understood to further include one or more other areas on the ground but in proximity to the aircraft 101 (e.g., a gate within an airport, a baggage loading station, a fueling station, etc.). Thus, it should be understood that an aircraft cabin environment, as referred to herein, is not limited to just the physical area bounded by the fuselage of the aircraft 101.

The aircraft 101 includes a plurality of seats 220, generally corresponding to respective passengers and/or crew members within the aircraft cabin environment 200a. One or more personal devices 119 may be associated with each of the respective passengers. A seatback unit 118 may be affixed to a seat or other surface to serve the passengers and/or crew members at each of the respective seats 220.

The cabin environment 200a may include one or more positioning devices 224 operable to facilitate determination of a location of a person (e.g., location of a personal device 119). The one or more positioning devices 224 may include, for example, one or more wireless positioning devices such as the wireless access points 114 depicted in FIG. 1, one or more iBeacons, one or more RFID devices, and/or one or more other near-field communication (NFC) devices. The one or more wireless positioning devices may operate using any one or more suitable protocols (e.g., BLUETOOTH low energy (BLE), Wi-Fi protocols, radio frequency identification (RFID) and/or a near field communication (NFC) protocols, etc.). Generally, the one or more wireless positioning devices may be operable to facilitate determination a current location of a person within the cabin environment 200a, based upon a detected location of a corresponding personal device 119. In some embodiments, for example, one or more wireless access points, iBeacons, and/or RFIDs may transmit (e.g., broadcast) signals to and/or receive communications signals from a personal device 119, and a current location of the personal device 119 may be determined based upon a detected signal strength, as measured at the personal device 119, at one or more wireless positioning devices, and/or at the on-board server 111.

In some embodiments, the one or more positioning devices 224 may additionally or alternatively include one or more input devices operable to receive input from a human user indicative of the user's location within the cabin environment 200a. Input devices may include one or more biometric input devices, such as an iris scanner, a fingerprint scanner, a facial scanner, or a voice recognition device. A biometric input device may receive biometric input (e.g., an iris or fingerprint scan, audio input, etc.) and facilitate identification of a particular person based upon comparison to reference biometric data stored at the biometric input device, at the on-board server 111, and/or at another location exterior to the aircraft 101. Location of a person may thereby be determined based upon the known location of the biometric device.

In some embodiments, an input device may receive other forms of input (e.g., a touch screen selection, or a literal voice command) from a person, the received input indicative of the person being at the known location of the input device. The one or more input devices may be wiredly and/or wirelessly connected to one or more wireless access points and/or the on-board server 111. In any case, it should be understood that selection and arrangement of positioning device(s) 224 included within any particular aircraft cabin environment may vary.

The cabin environment 200a may include various other physical locations. These locations may include, but are not limited to, the entranceway 228, one or more lavatories 232 ("L"), one or more galleys 236 ("G," e.g., a kitchen, food cart, etc.), one or more emergency exits 238 ("E"), and/or one or more storage compartments 240 (e.g., overhead storage compartments). In some embodiments, one or more positioning devices may be strategically positioned at or near a location. For example, one or more input devices may be positioned outside a lavatory 232, such that a person may optionally use the input device to provide a current location, facilitating use of the navigation aid techniques described herein.

The cabin environment 200a includes one or more lighting devices 244. Lighting devices may include, for example, aisle lighting devices, such as one or more LED bulbs installed in rows along an aisle or other walking space in the environment 200a. Additionally or alternatively, the one or more lighting devices may include one or more overhead lighting devices fixedly mounted above one or more seats 220. Still additionally or alternatively, the one or more lighting devices 244 may include one or more luminous signs or public display screens mounted to a surface within the aircraft 101 or elsewhere in the environment 200a. In some embodiments, the on-board server 111 may be operable to control and/or monitor operation of the one or more lighting devices 244 to provide navigation aid in the aircraft cabin environment 200a.

The on-board server 111 may store environmental layout data indicative of the dimensions and/or arrangements of computing devices, lighting devices, and locations in the aircraft cabin environment 200a. Based at least in part upon the environmental layout data, a particular lighting device 244 or other computing device may be identified as being physically located between a particular two locations within the aircraft cabin environment 200a.

Moving to FIG. 2B, the environment 200b includes another embodiment of the aircraft 101 with a modified arrangement of elements therein. In this embodiment, the cabin of the aircraft 101 includes two levels of seating, the two levels traversable via either of a stairway 260a or stairway 260b. Each level of seating may include a plurality of seats 220, each of which may similarly be associated with respective passengers, seatback units 118, and/or personal devices 119. Either or both levels of seating may comprise one or more positioning devices 224, one or more lavatories 232 ("L"), one or more galleys 236 ("G"), one or more emergency exits 238 ("E"), one or more overhead storage compartments 240, one or more lighting devices 244, and/or any of the other suitable elements depicted in FIG. 2A. Communications across both levels of seating may be facilitated via the on-board server 111 ("A"), positioning device (s) 224, and LAN 110.

The complexity of the cabin environment 200b exemplifies the potential inconveniences caused by crowded navigable environments. That is, the cabin environment 200b includes many seats 220, multiple routes of passage on each level of seating, and multiple usable lavatories 232. For passengers and/or crew members, navigating these environments may prove especially challenging, particularly when these environments are crowded or dimly lit, as is often the case in the cabin of an aircraft in flight. Challenges may be found, for example, in finding an unoccupied lavatory, finding a particular seat, or performing various crew tasks. By accounting for the particular arrangement of a navigable environment and producing an ad hoc activation arrangement, the techniques described herein may reduce discomfort for persons navigating such environments.

Example Navigation Aid Devices

Figure 3:
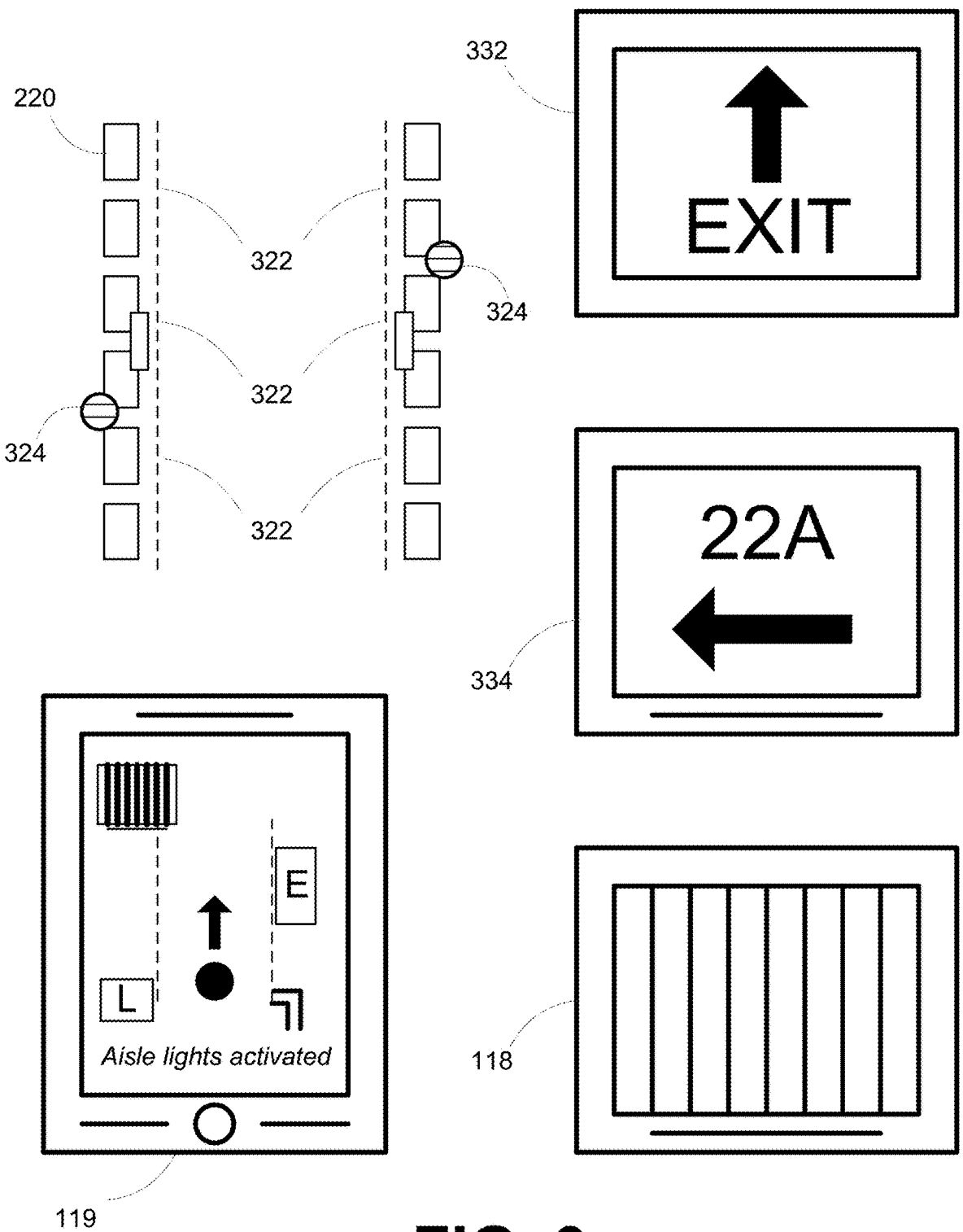
FIG. 3 depicts example "navigation aid devices" that may be caused to activate in an activation arrangement.

FIG. 3 depicts example navigation aid devices via which navigation aid may be provided in a navigable physical environment such as an aircraft cabin. Navigation aid devices may be included in an ad hoc activation arrangement, and may be activated accordingly to guide a person about the navigable environment. In some embodiments, one or more navigation aid devices may be activated via one or more signals from an on-board server within an aircraft (e.g., on-board server 111), and/or via another centrally disposed computing device within the navigable environment. While the description of navigation aid devices with respect to FIG. 3 will focus primarily on visual aid devices and visual aid techniques associated therewith, it should be appreciated from this detailed description that navigation aid devices/techniques may include visual, audial, and/or haptic aid devices and techniques.

Visual aid devices within a navigable environment may include any one or more of the lighting devices 244 discussed with respect to FIGS. 2A and 2B. These lighting devices 244 may include, for example, one or more aisle lighting devices 322, which are typically placed in rows along seats 220. Lighting devices may include additionally or alternatively one or more overhead lights 324, one or more luminous signs 332, and/or one or more public display screens 334. Navigation aid devices may additionally include one or more seatback units 118. Still additionally or alternatively, navigation aid devices may include one or more personal devices 119 as discussed with respected to FIGS. 1, 2A, and 2B.

The one or more aisle lighting devices 322 may include LED bulbs and/or other suitable devices fixedly located in one or more rows along an aisle or other passageway in the navigable environment. In some embodiments, each aisle lighting device 322 may be activated independently, such that as a person walks along an aisle, for example, the aisle lighting devices 322 may activate sequentially to lead a person along the aisle. In some embodiments, one or more aisle lighting devices 322 may be activated according to one or more modifiable activation characteristics, such as a modifiable pattern (e.g., flicker, blinking, pulse, etc.), color, color pattern, or brightness.

The one or more overhead lights 324 may generally include one or more LED bulbs and/or other suitable lighting devices fixedly located within the navigable environment. In some embodiments, for example, one overhead light 324 may be placed above each seat 220 within an aircraft, or above a group of seats 220. In some embodiments, one or more overhead lights 324 may be activated according to one or more modifiable activation characteristics, such as a particular pattern (e.g., flicker, blinking, pulse, etc.), color, color pattern, or brightness.

The one or more luminous signs 332 may generally include various luminous signage placed about the navigable environment. For example, as depicted in FIG. 3, a luminous sign 332 may, when activated, indicate a direction to an exit. In some embodiments, one or more luminous signs 332 may be activated according to one or more modifiable characteristics, such as a particular pattern (e.g., flicker, blinking, pulse, etc.), color, color pattern (e.g., an alternating color pattern, or a striping pattern), or brightness.

The one or more public display screens 324 may generally include any of various display devices placed in common areas within the navigable environment. That is, a public display screen 324 may be distinguished from a display screen of a seatback unit 118 in that, while a seatback unit 118 generally corresponds to a particular seat 220, a public display screen 324 may be placed in a location not particularly tied to any one particular person within the navigable environment. A public display screen 324 may, for example, display text content and/or a directional cue (e.g., an arrow indicating direction to a seat "22A" as depicted in FIG. 3). Additionally or alternatively, a public display screen 324 may be configured to display a particular color, particular color pattern, or other content according to modifiable characteristics, such that public display screens in common areas may be differentiated as corresponding to a particular activation arrangement.

Thus, within a navigable environment, any of one or more lighting devices 244 may be activated to guide a person to a destination within the navigable environment. Moreover, the various modifiable activation characteristics of activated lighting devices 244 may allow for effective differentiation of visual aid devices as corresponding to particular persons. In some embodiments, for example, executing an activation arrangement for a first person may include causing one or more lighting devices 244 to display blue light, whereas executing an activation arrangement for a second person may include causing one or more lighting devices 244 to display red light. These techniques may facilitate effective differentiation of two or more activation arrangements executing simultaneously in a same navigable environment.

The one or more seatback computing devices 118 may be activated, for example, to display a particular color, color pattern, image, etc. Activation of a seatback unit 118 may be particularly useful, for example, to assist an aircraft passenger returning to the seat from a lavatory or other location within an aircraft cabin environment. That is, a destination of a seat may be easily identified by an activated seatback unit adjacent to the seat.

The one or more personal devices 119 may be activated to display various visual prompts and/or other prompts for a person moving about the navigable environment. As depicted in FIG. 3, for example, a personal device 119 may be activated to display an interactive mini-map of the navigable environment, the mini-map including a current location of the person, a destination, and/or other reference locations within the navigable environment. In some embodiments, the personal device 119 may be activated indicate other aid devices that are currently activated or that will soon be activated as part of an executing activation arrangement. For example, as depicted in FIG. 3, the personal device may indicate that aisle lights 322 have been activated, and that a seatback unit 118 that is activated or will be activated in a vertical striping pattern.

Navigation aid devices used in a navigable environment may additionally or alternatively include audial aid devices (e.g., speakers) and/or haptic aid devices (e.g., vibration devices). A speaker may be activated, for example, to play a particular verbal cue or other sound to provide navigation aid. In some embodiments, a same navigation aid device may be more than one of a visual, audial, or haptic aid device. For example, one or more public display screens 334 may further include a speaker unit operable to provide audial navigation aid. As another example, a personal device 119 may be operable to provide visual, audial, and/or haptic navigation aid.

In the example aircraft cabin environments described herein, each of the navigation aid devices described herein may be activated via one or more signals transmitted via the on-board server 111. The on-board server 111 may, for example, determine an activation arrangement of one or more navigation aid devices, and may transmit one or more signals to each of the one of more navigation aid devices to cause the respective devices to activate according to the determined activation arrangement.

Example Computer-Implemented Navigation Aid Method

Figure 4:
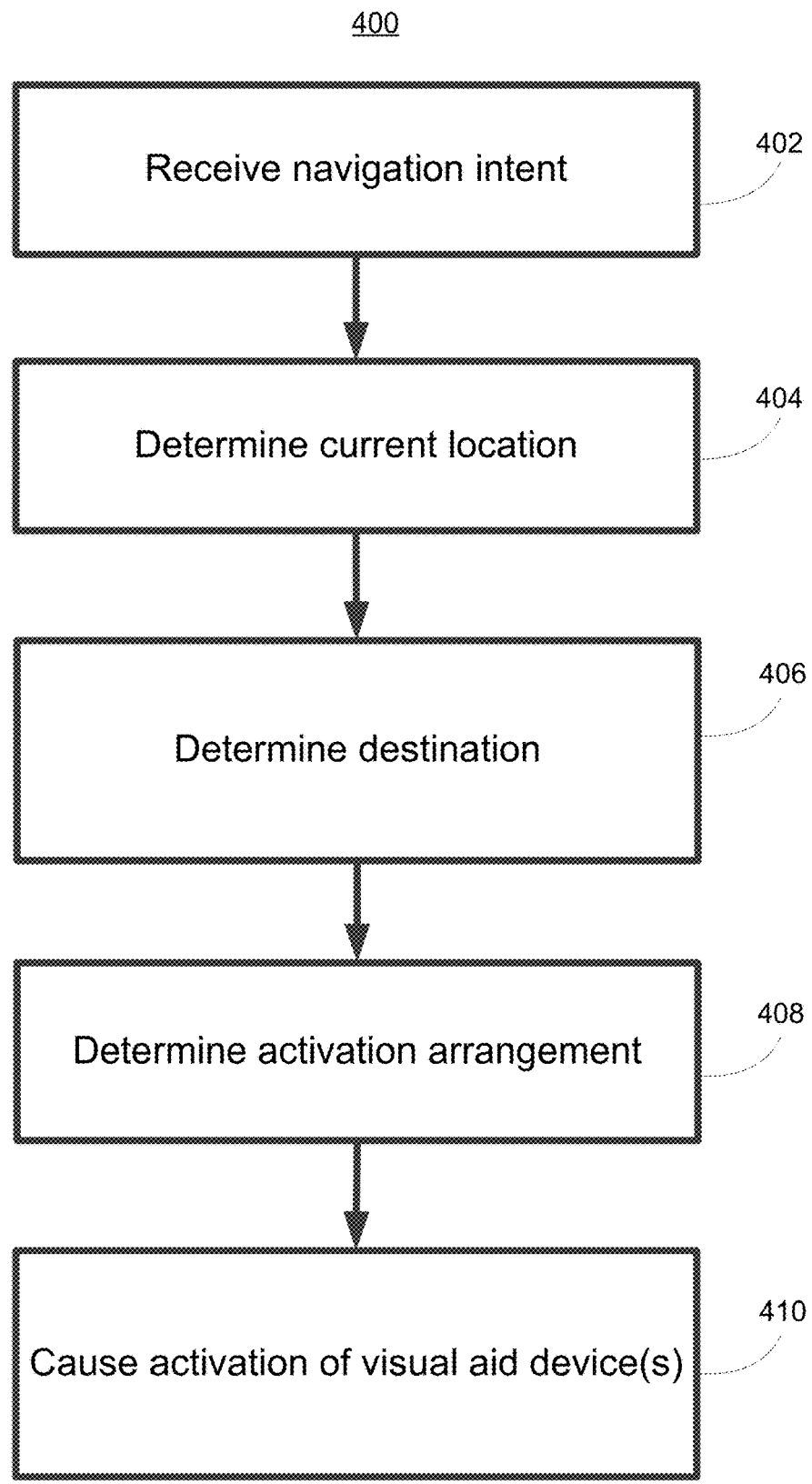
FIG. 4 depicts an example computer-implemented method for providing navigation aid to a person in a navigable environment.

FIG. 4 describes an example computer-implemented method 400 for providing navigation aid to a person in a navigable environment, such as an aircraft cabin environment. Generally, the method 400 may include determining and executing an "activation arrangement" of one or more navigation aid devices (e.g., one or more visual aid devices) to be activated within the navigable environment to guide a person to a destination. Actions of the computer-implemented method 400 may be performed, for example, via an on-board server 111 from FIGS. 1, 2A, and 2B, and/or via one or more other computing devices operatively disposed within the navigable environment.

The method 400 may include receiving an indication of a "navigation intent" of a person within the navigable environment (402). A navigation intent, as referred to herein, may generally include an intent of a person to navigate to a destination within the navigable environment. In the aircraft cabin environment of FIGS. 2A and 2B, for example, a navigation intent may be an intent of a person to find a particular seat, a lavatory, an entranceway or another location within the cabin environment. The indication of the navigation intent may be received, for example, via a client application executing at a personal device of the person, via an application executing at a seatback unit corresponding to the person, and/or via input provided at another input device (e.g., a biometric input device) located within the navigable environment.

In some embodiments, based upon the received indication of the navigation intent, an identity of the person may be determined. Identity of the person may be determined, for example, based upon identification of the personal device or seatback unit from which the indication of the navigation intent is received. More specifically, in some embodiments, identity of the person may be determined based upon an identity of a logged-in user at a client application from which the indication of the indication navigation intent was received (e.g., an application running at a personal device or seatback unit). Additionally or alternatively, identity of the person may be determined based upon a comparison of optionally provided biometric data (e.g., iris scan, facial scan, fingerprint scan, etc.) to reference biometric data stored at an on-board server or other computing device. In some embodiments, determination of identity may facilitate determination of an activation arrangement in accordance with customization settings corresponding to an identified person. Additionally or alternatively, determination of the identity of the person may facilitate determination of one or more corresponding personal devices and/or seatback units that may be used as navigation aid devices in the activation arrangement.

The method 400 may include determining, based upon the received indication of the navigation intent, a current location of the person within the navigable environment (404). In some scenarios, the current location of the person may be determined based upon the source of the indication of the navigation intent. For example, if the indication of the navigation intent is received from a seatback unit or another fixedly placed input device, location of the person may be determined based upon location of the source. Additionally or alternatively, the current location of the person may be determined based upon a location of a personal computing device (e.g., a smartphone) corresponding to the person. Location of a personal device may be determined, for example, based upon detected signal strength of signals exchanged the personal device and one or more wireless access points, RFID devices, iBeacons, and/or other suitable wireless positioning devices.

The method 400 may include determining, based upon the received indication of the navigation intent, a destination of the person within the navigable environment (406). In some scenarios, the received indication of the navigation intent may indicate a literal destination (e.g., "Seat 22E" in an aircraft cabin). Alternatively, in some scenarios, the received navigation intent may be less directly indicative of the destination. For example, the received indication of navigation intent may indicate a person's intent to "Find My Seat," or to "Find a Lavatory" without an explicit indication of the destination. In these scenarios, the destination may be determined, for example, based upon (1) stored flight record data mapping persons to seats, (2) stored environmental layout data indicating special layout of the aircraft cabin environment, (3) detected location of other persons/devices within the aircraft cabin environment, and/or (4) monitored availability/occupancy of a lavatory, entranceway, or other location within the aircraft cabin environment.

The method 400 may include determining, based upon the determination of the current location and destination, an activation arrangement (408). Generally, the activation arrangement may include a determination of one or more navigation aid devices (e.g., visual, audial, and/or haptic aid devices) to be activated in a particular manner to guide the person from the current location to the destination. Navigation aid devices may include, for example, any one or more of the aid devices described with respect to FIG. 3. In the example aircraft cabin environment, for example, one or more navigation aid devices may include a personal device, a seatback unit, and/or one or more lighting device within the aircraft cabin environment.

In some embodiments, determining the activation arrangement may include determining one or more activation characteristics for one or more of the navigation aid devices. For example, determining a visual aid device to be used in an activation arrangement may further include determining a brightness, color, color pattern, image, etc., according to which the lighting device may be activated. As another example, determining an audial aid device to be included in the activation arrangement may include determining a volume at which the device may be activated. As yet another example, determining a haptic aid device to be included in the activation arrangement may include determining a vibration intensity at which the device may be activated. Other examples of activation characteristics will evident from the description of FIG. 3.

In some embodiments, the determination of the activation arrangement may be based at least in part upon one or more monitored environmental conditions in the navigable environment or a portion thereof. For example, determining the activation arrangement may include determining that the navigable environment or a portion thereof (e.g., a current location) is dimly lit, and accordingly determining that a navigation aid device should be activated with a reduced brightness or a reduced volume to reduce disturbance to other persons.

In some embodiments, the determination of the activation arrangement may be based at least in part upon user customization settings corresponding to the user. In some embodiments, for example, a user may provide input indicative of preferred navigation aid devices and/or preferred activation characteristics (e.g., color, volume, etc.). Example interfaces for user customization settings are depicted in FIGS. 8A-8D.

The method 400 may include, subsequent to determining the activation arrangement, causing the one or more navigation aid devices to activate according to the determined activation arrangement (410, e.g., to display light, to play sound, to vibrate, etc.). Causing the one or more navigation aid devices to activate may include causing the one or more navigation aid devices to activate alternately or simultaneously. For example, in some embodiments, the method 400 may include continuously determining the location of the person within the navigable environment (e.g., via location determination at a predetermined rate), and causing one or more navigation aid devices to activate only as the person passes or approaches each device (e.g., enters a predetermined threshold proximity of the device), as determined based upon the updated location of the person.

In some embodiments, activation of the one or more navigation aid devices may terminate in response to a determination that the person has arrived at the destination in the navigable environment. Arrival of the person at the destination may be determined, for example, based upon any of the wireless location techniques described herein. Additionally or alternatively, arrival of the person at the destination may be determined based upon further input received via a seatback unit, personal device, or other input device as described herein.

As used herein "causing a device to activate," or similar phrases, should be interpreted as causing a device to operate in a particular manner (e.g., in accordance with a predetermined activation arrangement). "Activation" of a device should not be interpreted to mean that the activated device was necessarily powered off, in a sleep mode, not running a particular application, or otherwise inactive by any particular definition prior to "activation." Activation of a visual aid device may, for example, include causing a personal device to display a push notification or other content when the device is already powered on and running an application.

The method 400 may include additional, fewer, or alternate actions, in some embodiments.

Example Use Scenario in Aircraft Cabin Environment

Figure 5A:
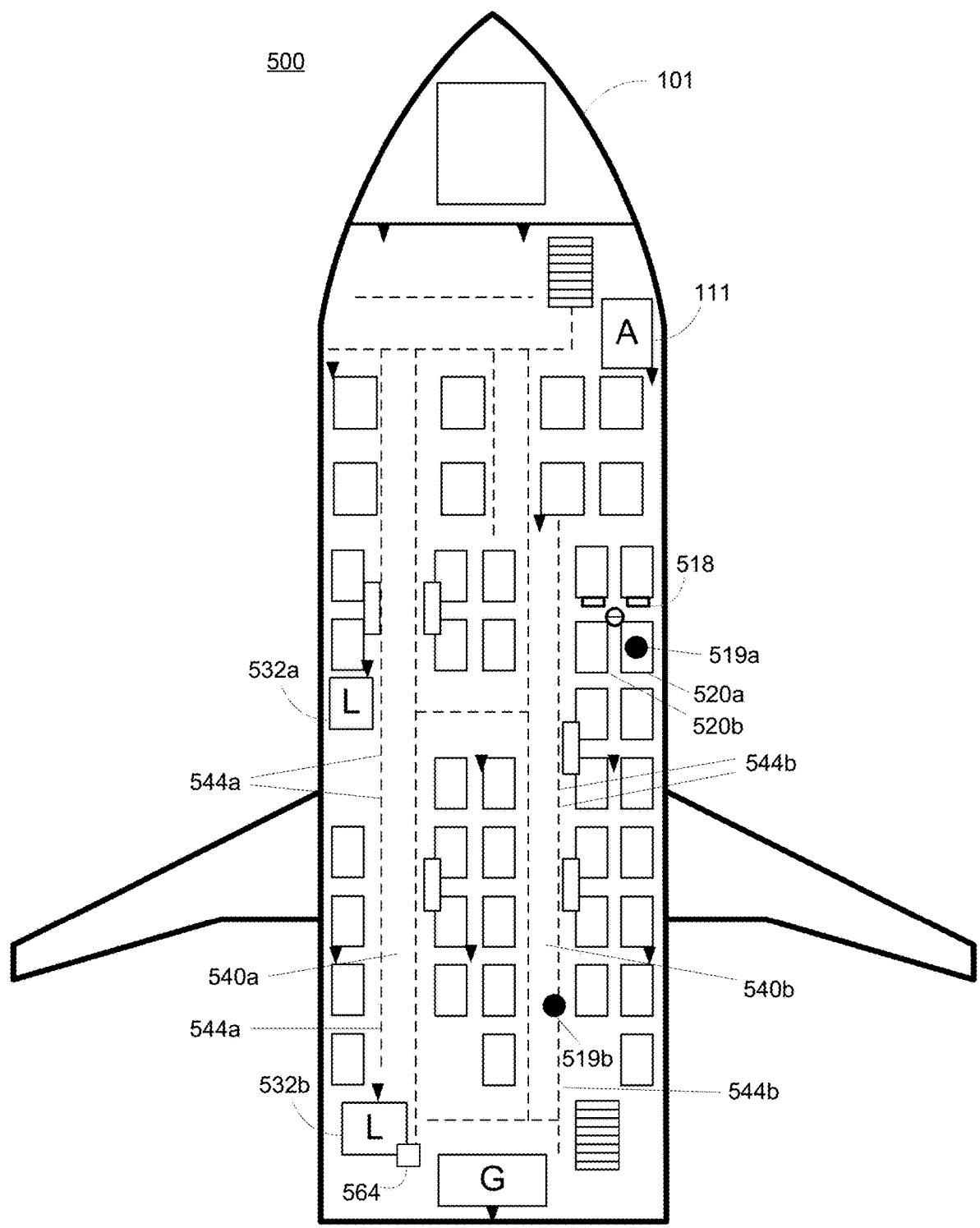
FIGS. 5A-5B depict example use scenarios of the computer-implemented method from FIG. 4.
Figure 5B:
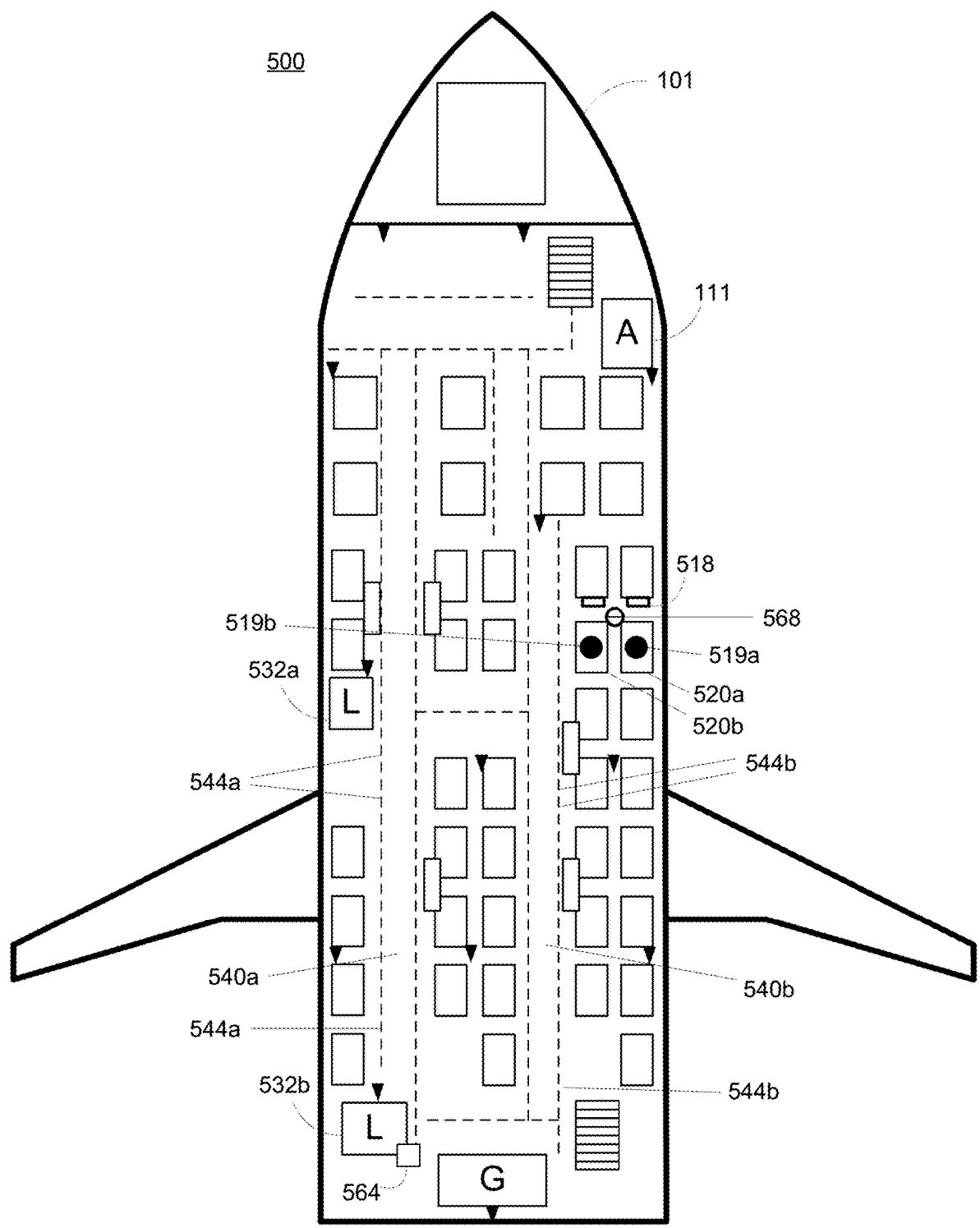

FIGS. 5A and 5B depict example use scenarios of the navigation aid techniques described herein (e.g., the computer-implemented method 400 from FIG. 4). Specifically, FIGS. 5A and 5B provide example use scenarios in an aircraft cabin environment 500, within which an activation arrangement may be determined and executed. It should be understood that the aircraft cabin environment 500 may include any of the elements described with respect to the example aircraft cabin environments 200a and 200b from FIGS. 2A and 2B. For the sake of these example use scenarios, though, some elements and reference signs from FIGS. 2A and 2B are removed, and others are rearranged.

First referring to FIG. 5A, the example use scenario includes aircraft passenger initially seated a seat 520a and seeking an occupied lavatory within the aircraft cabin environment 500. The passenger is represented in this example by a passenger personal device 519a, which may typically be carried by the passenger. An indication of a navigation intent may be received, indicating the intent of the person to find a nearest available lavatory.

A current location of the person may be determined, for example, based upon a location of the personal device 519a as determined using any suitable wireless location technique described herein. Alternative location techniques, including any suitable technique described herein, may be used in some embodiments.

In this example use scenario, the received indication of the navigation intent may not explicitly indicate a particular lavatory as a destination. The on-board server 111 may monitor a status of each of the lavatories 532a and 532b (e.g., occupied or unoccupied), and determine, after receiving the indication of the navigation intent, that the lavatory 532a is occupied and that the lavatory 532b is unoccupied. Accordingly, the destination may be determined to be the lavatory 532b.

Based upon the determined current location and destination, an activation arrangement may be determined. In this example scenario, multiple possible paths exist between the personal device 519a and the lavatory 532b. A first possible path follows an aisle 540a, and a second possible path follows an aisle 540b. Accordingly, determining an activation arrangement may include determining a path between the current location and destination, such that a suitable one or more aid devices may be selected and activated. In this example scenario, it may be determined that a second personal device 519b is located in the aisle 540b. To reduce crowding within the aircraft cabin environment 500, it may be determined that the passenger should use the first path along the aisle 540a to reach the lavatory 532b. Accordingly, an activation arrangement may be determined to include a series of aisle lighting devices 544a along the aisle 540a, and not include a series of aisle lighting devices 544b along the aisle 540b.

An input device 564 (e.g., a biometric device) may be located outside the lavatory 532b. In some embodiments, the input device 564 may receive input from the passenger, the input indicative of passenger having arrived at the lavatory 532b. Upon detection of arrival of the passenger at the lavatory 532b, execution of the activation arrangement may be completed.

FIG. 5B illustrates another use scenario of navigation aid techniques in the aircraft cabin environment 500. In this scenario of FIG. 5B, the same passenger may intend to return from the lavatory 532b to the seat 520a. An indication of a navigation intent may be received, for example, via the personal device 519a, the input device 564, and/or another suitable device. In response to receiving the navigation intent, the current location and destination of the passenger may once again be determined, using any suitable techniques described herein.

After determining the current location current location and destination of the passenger, another activation arrangement may be determined. In the use scenario of FIG. 5B, the personal device 519b is no longer located in the aisle 540b.

Instead, the personal device 519b is located in the seat 520b, which obstructs the path to the seat 520a, and in which a passenger may currently be seated. Typically, the return of a passenger from a lavatory or another location may pose an inconvenience to the passenger seated in the seat 520b, as the seated passenger may be required to briefly exit their seat to allow the first passenger access to the seat 520a. In some embodiments, determining an activation arrangement may comprise (1) determining that one or more further persons may be required to move to accommodate the navigating passenger (e.g., based upon the location the device 519b), and (2) identifying one or more further aid devices to be activated to alert the one or more such persons of the navigating passenger's movement. For example, the determined activation arrangement in this scenario may include (1) activation of one or more overhead lights 568, (2) activation of the personal device 519b, (3) activation of one or seatback units corresponding to the seat 520b. In some embodiments, these techniques may be integrated into a one or more client applications used by the further persons, such that one or more visual, audial, and/or haptic prompts may be provided to the further person(s) if the further person(s) is/are distracted by consumption of services or content via a seatback unit or personal device. In some embodiments, the one or more prompts provided to a further person may be determined based upon a determination of services/content currently being consumed by the further person via a personal device and/or seatback unit.

In any case, arrival of the navigating passenger at the seat 520a may be detected via wireless locating of the personal device 519a, via input at the personal device 519a and/or the seatback unit 518, and/or via other techniques described herein. Upon detection of arrival of the passenger at the seat 520a, execution of the activation arrangement may be completed.

Example Navigation Interface in Cabin Environment

Figure 6A:
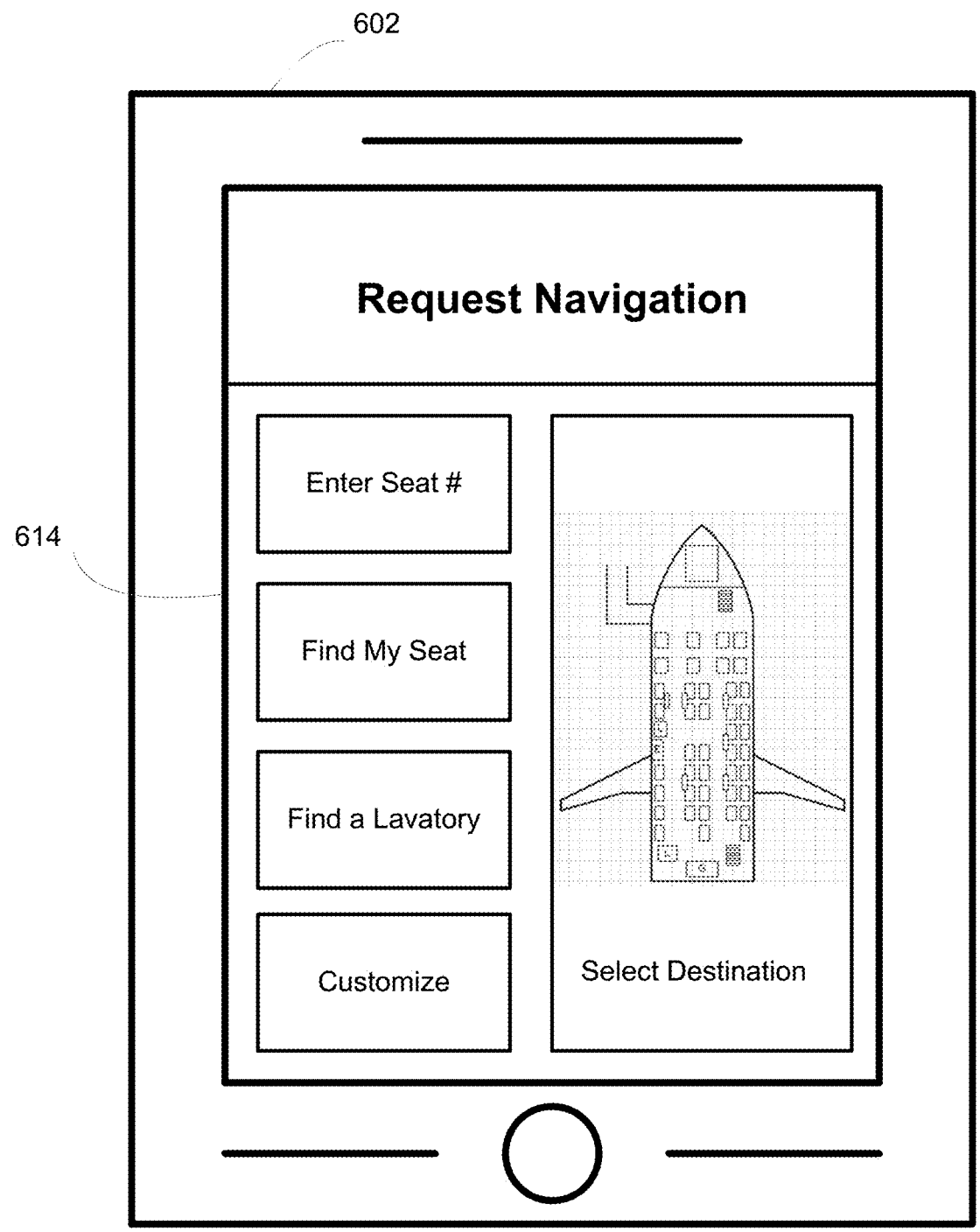
FIGS. 6A-6B depict example graphical user interfaces via which a user may request navigation aid.
Figure 6B:
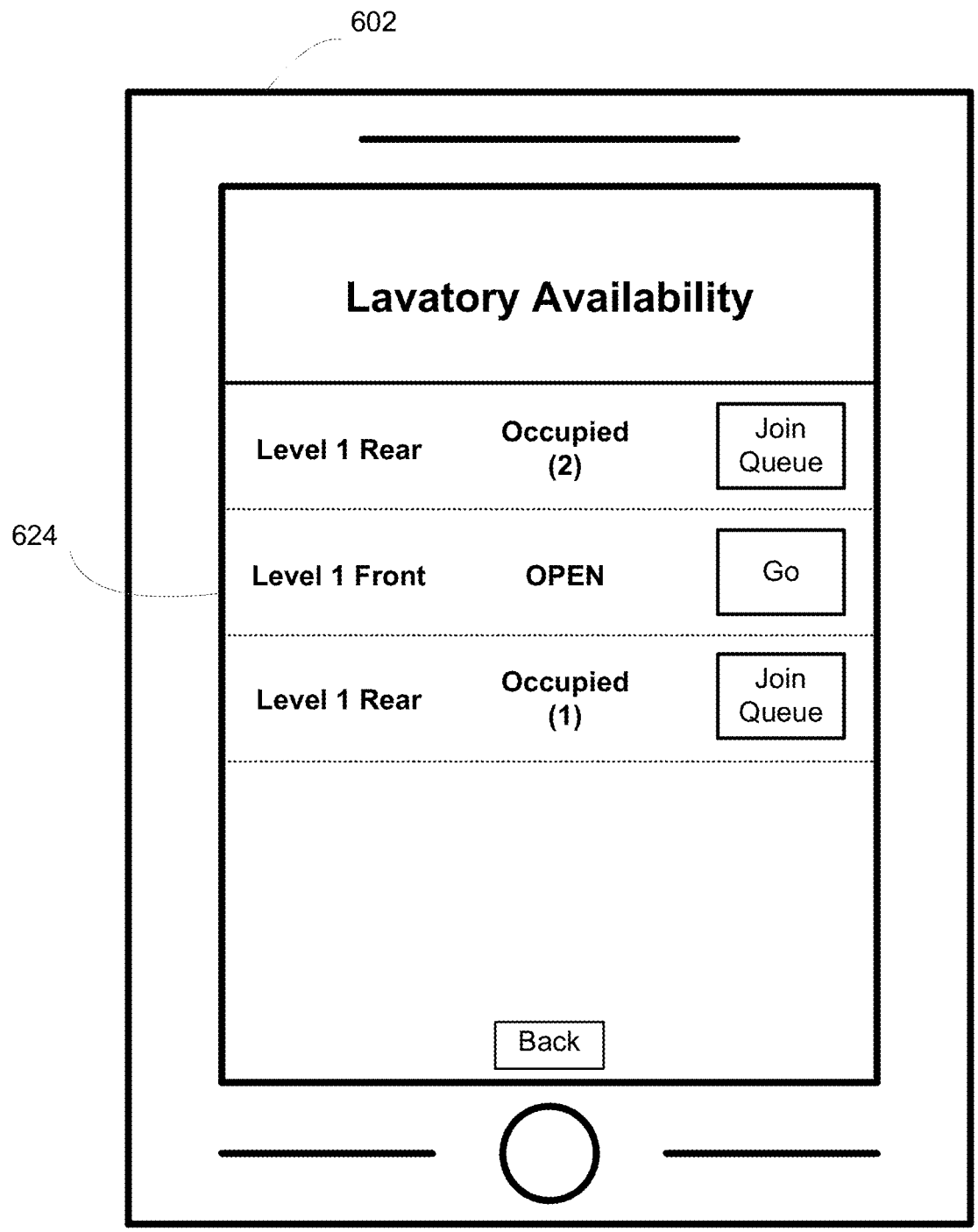

FIGS. 6A and 6B depict example interactive graphical user interfaces that may be presented via an electronic device 602 (e.g., via a client application executing at a personal device or seatback unit) to enable navigation within the aircraft cabin environment. Input may be received at the user interfaces of FIGS. 6A and/or 6B via a touchscreen interaction (e.g., touch, swipe, etc.), vocal input, and/or via other suitable input methods.

Referring first to FIG. 6A, a user such as a passenger or a crew member may utilize the interface 614 to indicate an intent to navigate to a destination within the aircraft cabin environment. For example, a user may select an "Enter Seat Number" option to provide an indication of a particular seat to which the user intends to navigate. Alternatively, if the user is not aware of the user's own seat number, the user may select a "Find My Seat" option. In response to receiving a "Find My Seat" selection, the device 602 may communicate, for example, with an on-board server and/or one or more other computing devices storing information that associates the user with a known seat number, thereby identifying a destination in response to the received user selection via the interface 614. The user may additionally or alternatively utilize the interface 614 to select a "Find a Lavatory" option, selection of which may enable a user to view a status of one or more lavatories in the cabin environment to identify a particular lavatory that is unoccupied. An example user interface for viewing the status of one or more lavatories will be described with respect to FIG. 6B.

The user may additionally or alternatively utilize the interface 614 to select a "Customize" option, selection of which may enable a user to personalize the aid devices and/or techniques (e.g., colors, patterns, etc.) to be provided in navigable environment. Example user interfaces for personalizing aid devices and/or techniques will be described with respect to FIGS. 8A-8D. In some embodiments, the interface 614 may include a "Select Destination" option, selection of which enables a user to view an interactive mini-map of the aircraft cabin environment to familiarize the user with the environment and/or to select a destination from the mini-map.

Moving to FIG. 6B, an interface 624 may be presented at the device 602 in response to selection of the "Find a Lavatory" option from the interface 614, in some embodiments. The interface 624 may include a list of lavatories within the aircraft cabin environment, with each lavatory identified by its general location within the cabin. The interface 624 may display a status of each of the lavatories as monitored within the aircraft cabin environment (e.g., occupied or unoccupied). In the example depicted in FIG. 6B, one lavatory is unoccupied, and a user may use a "Go" control to indicate an intent to navigate to that lavatory. In response, an activation arrangement of one or more visual aid devices and/or other aid devices may be determined and executed to guide the user to the selected lavatory.

If all lavatories are occupied, or if the user prefers to user a nearby lavatory that is occupied, the user may select a "Join Queue" option to enter a lavatory queue, which may allow a user to "wait in line" for a lavatory without needing to leave their seat. When the user reaches the "front" of the queue, the device 602 may notify the user of the unoccupied lavatory (e.g., via a push notification, and/or via another visual, audial, or haptic prompt such as those described herein). Furthermore, in response to the user reaching the front of the queue, an activation arrangement may be determined and/or executed to guide the user to the selected lavatory.

Example Flight Crew Workflow Techniques

Figure 7:
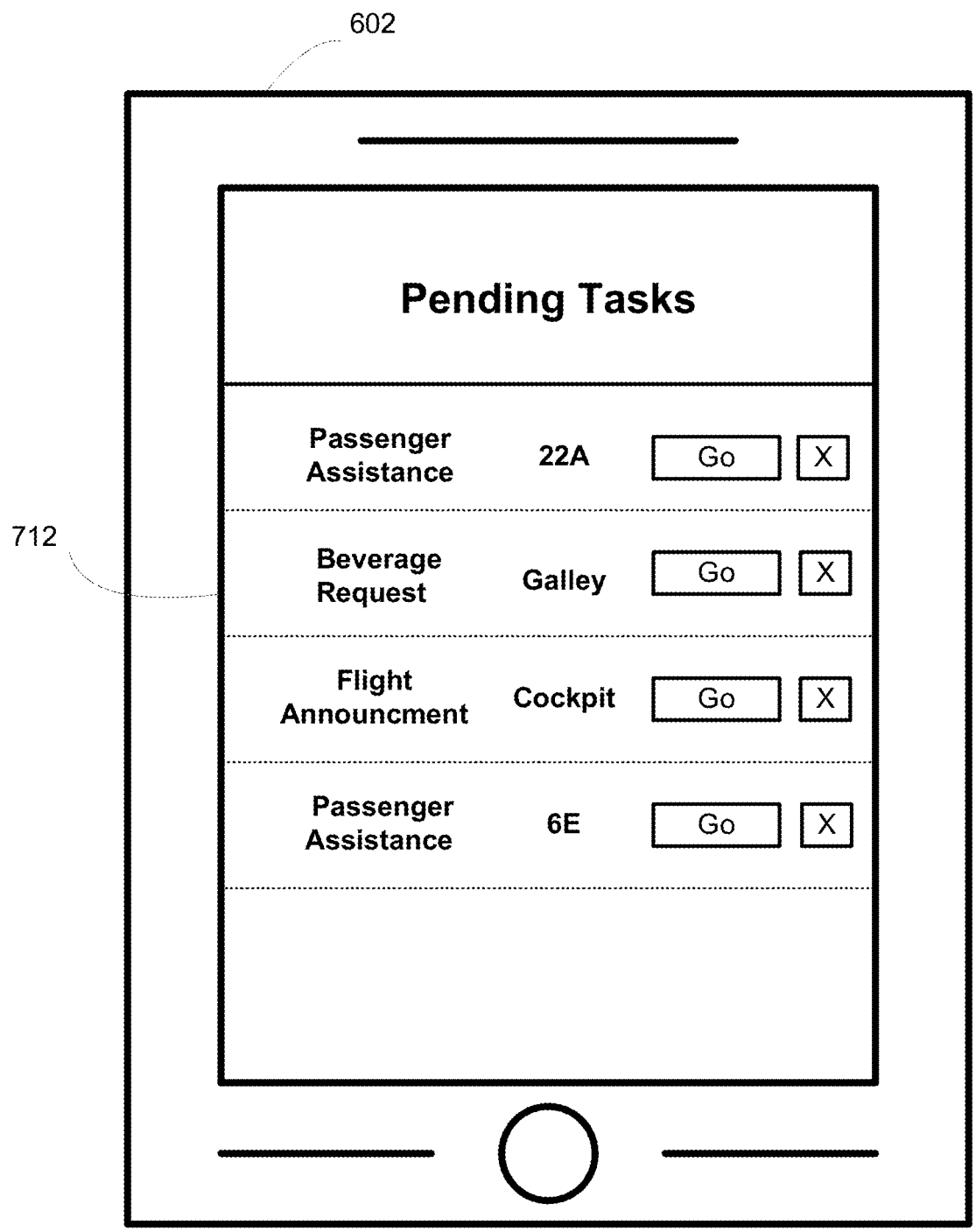
FIG. 7 depicts an example workflow management graphical user interface via which a crew member in an aircraft cabin environment may request navigation aid.

Embodiments of the aid techniques described herein may facilitate performance for various tasks by a user such as a flight attendant within an aircraft cabin environment. FIG. 7 depicts an example graphical user interface 712 presented at the electronic device 602 (e.g., a personal device of a crew member). The user interface 712 may be presented, for example, via a workflow client application executing at the device 602. Input may be received at the user interface 712 via a touchscreen interaction (e.g., touch, swipe, etc.), vocal input, and/or via other suitable input methods.

The interface 712 presents a listing of received tasks for the user. In some embodiments, tasks may be populated at the interface 712 based upon communications between the device 602 and an on-board server, which may receive passenger service requests and/or manage other scheduled tasks during flight (e.g., scheduled announcements after takeoff or before landing).

Each of the presented tasks includes user options that may be selected to either activate the task ("Go") or remove the task from the presented listing of tasks ("X"). Activation of a task via the "Go" option may cause an activation arrangement to be determined and/or executed to guide the user to the location as required to perform the task (i.e., the destination). In some embodiments, in response to detection of the user arriving at the destination, the task may be automatically removed from the listing of tasks.

Example Guidance Personalization Interfaces

FIGS. 8A-8D depict example interactive user interfaces that may be presented at the electronic device 602 to allow a user (e.g., passenger or crew member) within a navigable environment (e.g., aircraft cabin environment) to view and/ or alter the visual, audial, and haptic aid devices and techniques to be used in an activation arrangement. Use of the interfaces depicted in FIGS. 8A-8D may enable the person to easily differentiate aid devices within a navigable environment, and thus may further facilitate simultaneous execution of two or more activation arrangements in the navigable environment without confusion to persons receiving navigation guidance. User interfaces such as those depicted in FIGS. 8A-8D may be presented, for example, via a client application executing at the device 602. Input may be received at the user interfaces of FIGS. 8A-8D via a touchscreen interaction (e.g., touch, swipe, etc.), vocal input, and/or via other suitable input methods. In some embodiments, the device 602 may communicate with an on-board server to indicate personalized settings as received via the device 602, such that settings may be viewed and/or modified consistently across two or more devices, and such that activation arrangements may be determined based upon the personalized settings. In some embodiments, one or more of the interfaces of FIGS. 8A-8D may be presented in response to a selection of the "Customize" option from FIG. 6A.

Figure 8A:
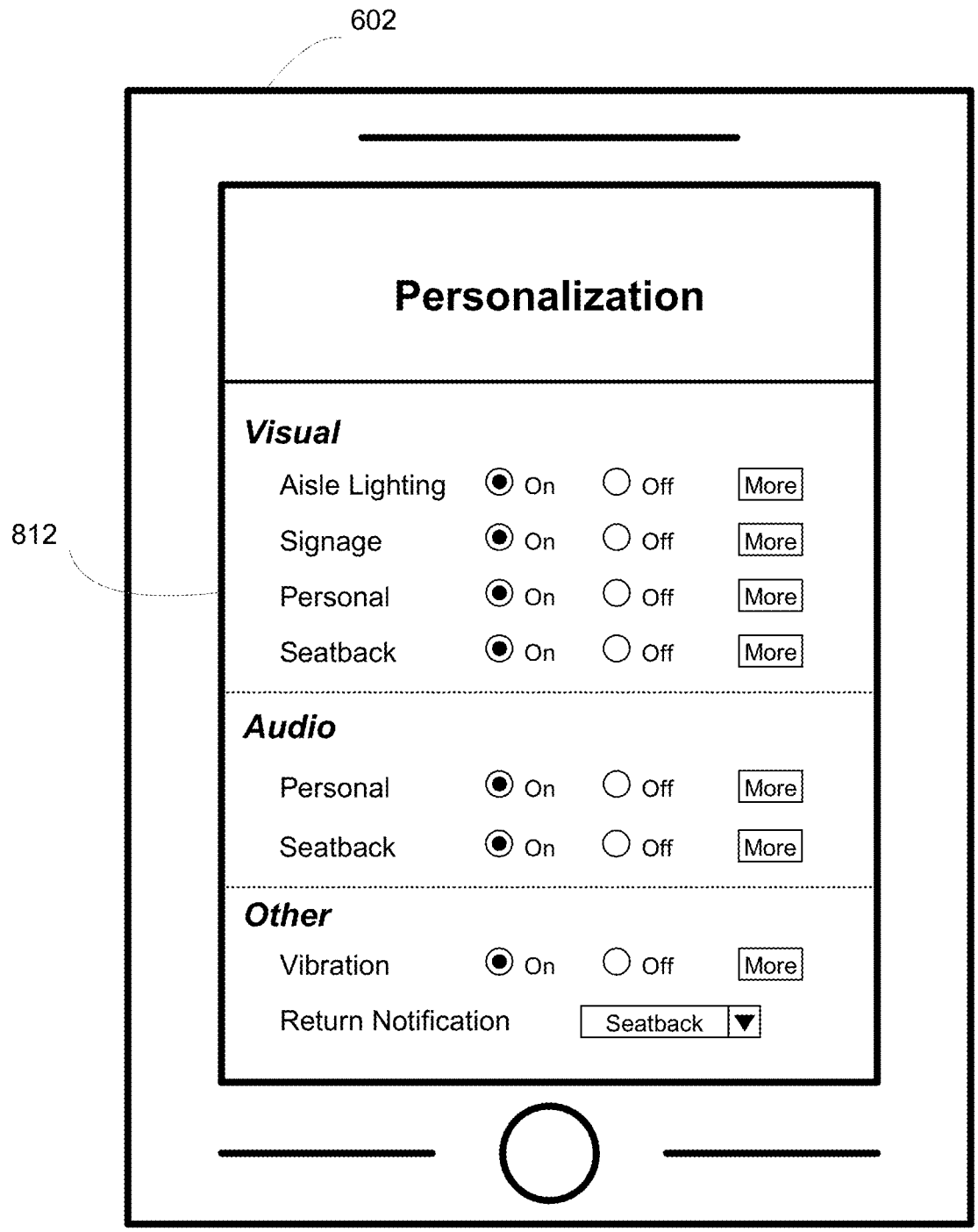
FIGS. 8A-8D depict example graphical user interfaces via which a user may personalize aid devices and activation characteristics associated therewith.

Referring first to FIG. 8A, an example interface 812 may present an overview of various navigation aid devices. In some embodiments, the listing provided in the interface 812 may correspond to the navigation aid devices available in a navigable environment in which the user is currently located (e.g., an aircraft cabin environment during a flight or prior to an upcoming flight). Alternatively, the interface 812 may present a comprehensive listing of navigation aid devices that may or may not be available across various navigable environments, such that the user may personalize aid devices for future use. In any case, listed aid devices may include aisle lighting devices, luminous signage ("Signage"), one or more registered personal devices ("Personal"), a seatback unit ("Seatback"), and/or other computing devices including lighting devices described herein.

For each listed device, options may be presented ("On" and "Off") to allow the user to indicate whether the device should be used in an activation arrangement. Additionally, for each listed device, a "More" option may be presented, selection of which may enable the user to further customize activation characteristics of the device. Examples of customized activation characteristics of particularly navigation aid devices will be described with respect to FIGS. 8B-8D.

In some embodiments, the interface 812 may include a "Return Notification" option, allowing the user to indicate a preferred technique via which the user may be notified when another person is returning to a seat (and may require the user to move to accommodate). In the example interface 812, the user may select a preference to be notified via a seatback unit, via a personal device, and/or via other suitable techniques described herein.

Figure 8B:
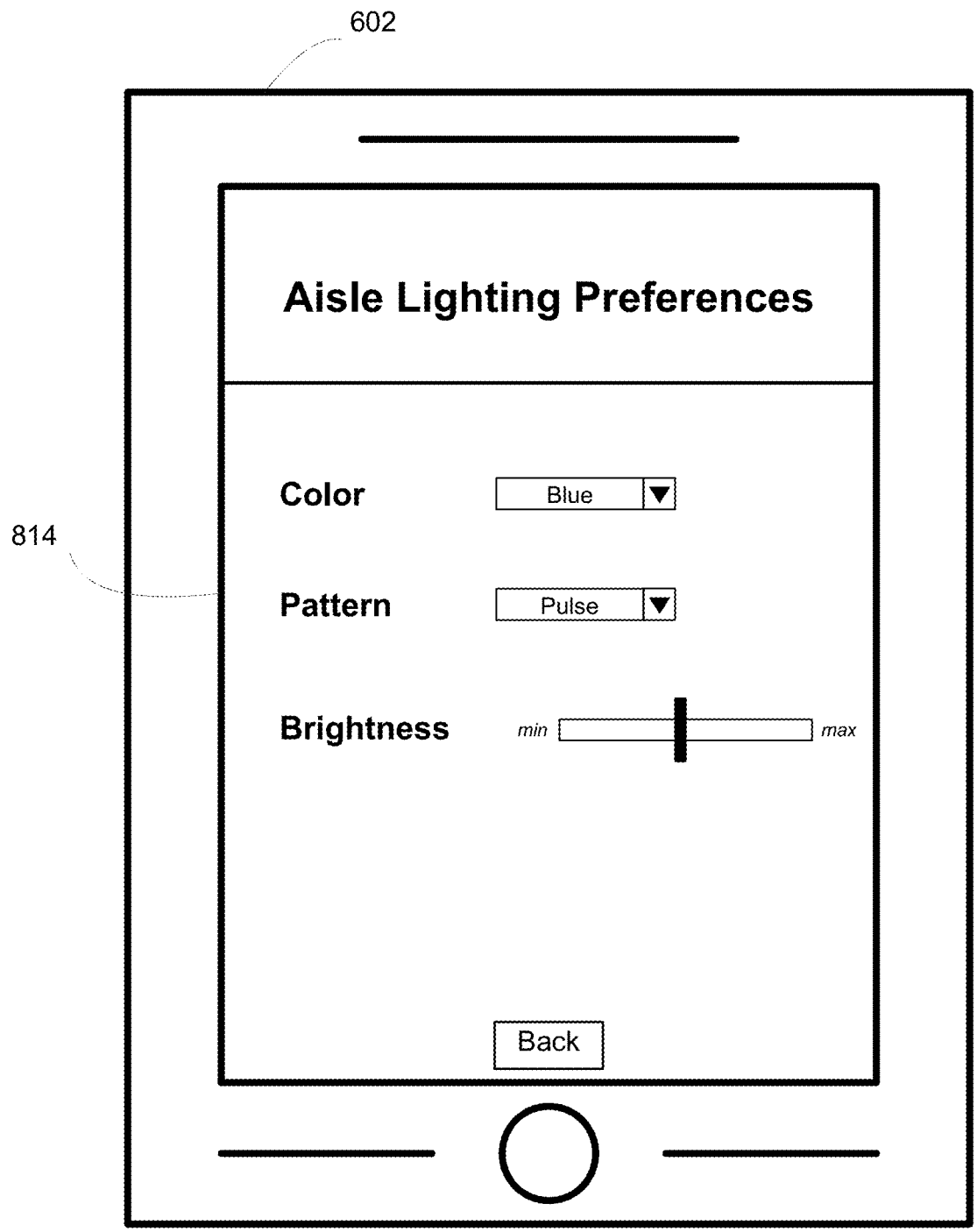

FIG. 8B depicts another example interface 814 that may enable a user to personalize one or more activation characteristics of a particular visual aid device. The interface 814 may be presented, for example, in response to selection of the "More" option corresponding to "Aisle Lighting" from the interface 812 of FIG. 8A. The interface 814 may, for example, enable the user to select options to select (1) one or more colors according to which aisle lighting devices may be activated (e.g., blue, red, alternating colors, etc.), (2) a pattern according to which aisle lighting devices may be activated (e.g., burst, flicker, pulse), and/or (3) a brightness at which the aisle lighting devices may be activated. Similar interfaces and options may be presented to personalize one or more visual activation characteristics of any suitable visual aid device in any suitable navigable environment.

Figure 8C:
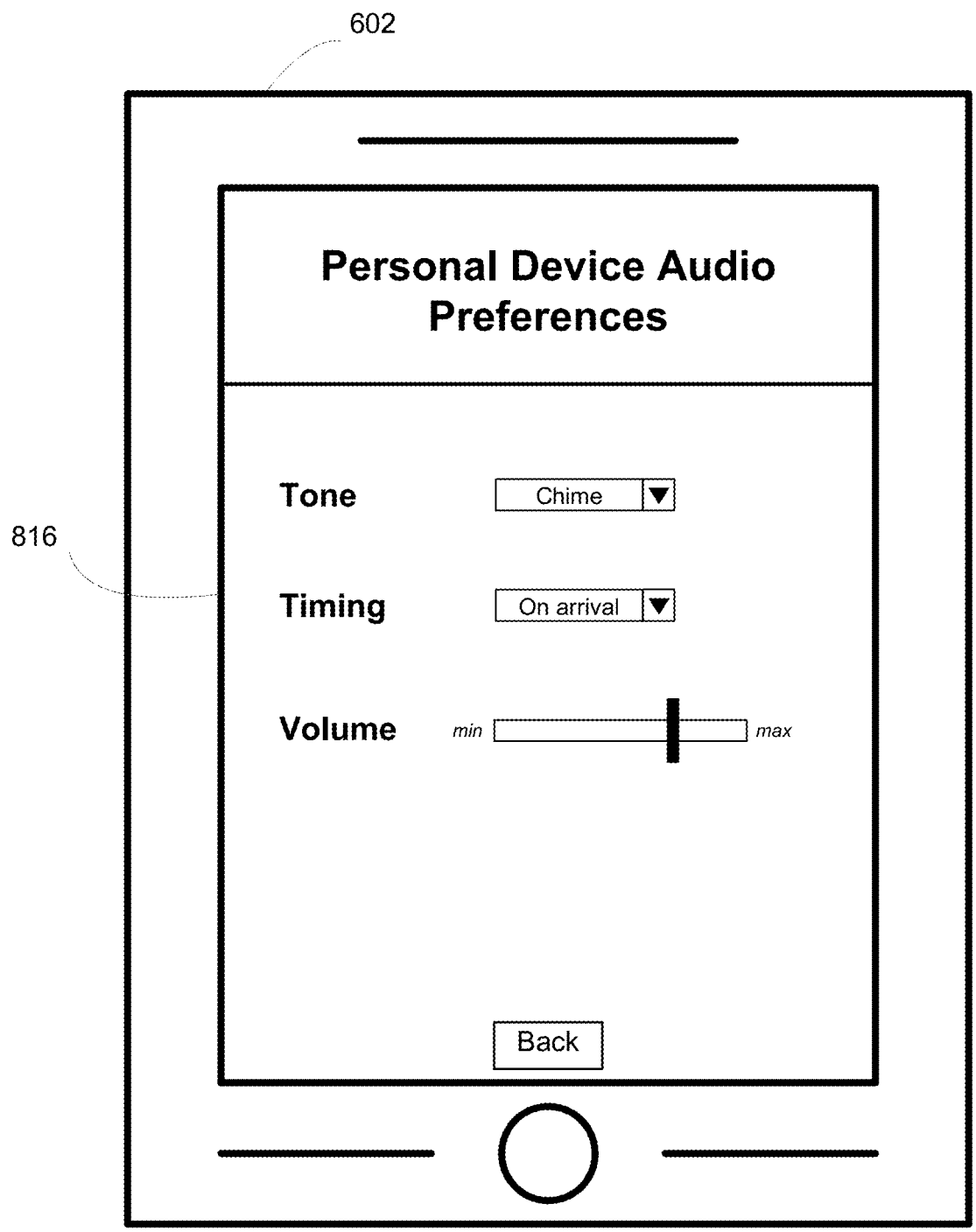

FIG. 8C depicts yet another example interface 816 that may enable a user to personalize one or more activation characteristics of a particular audial aid device. The interface 816 may be presented, for example, in response to selection of the "More" option corresponding to "Personal (Audio)" (e.g., smartphone audio) from the interface 812 of FIG. 8A. The interface 816 may, for example, enable the user to select options to select (1) a particular sound to be played to provide audial prompt to the user (2) a timing at which the selected tone may be played, and/or (3) a volume at which the tone may be played. Similar interfaces and options may be presented to personalize one or more activation characteristics of any suitable audial aid device in any suitable navigable environment.

Figure 8D:
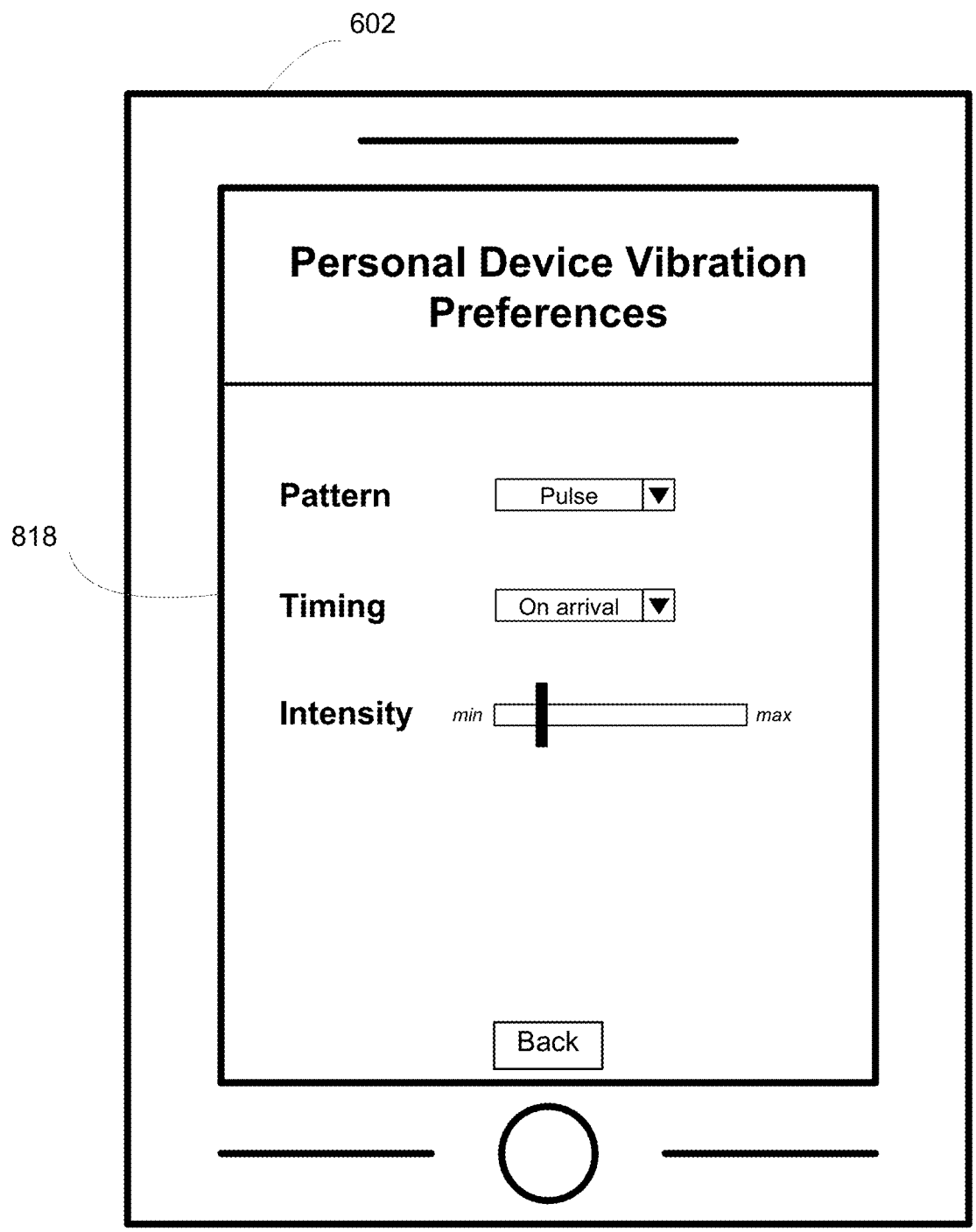

FIG. 8D depicts still another example interface 818 that may enable a user to personalize one or more activation characteristics of a particular haptic aid device. The interface 818 may be presented, for example, in response to selection of the "More" option corresponding to "Vibration" (e.g., smartphone vibration) from the interface 812 of FIG. 8A. The interface 816 may, for example, enable the user to select options to select (1) a particular vibration pattern (2) a timing at which the device may vibrate, and/or (3) an intensity at which the device may vibrate. Similar interfaces and options may be presented to personalize one or more activation characteristics of any suitable haptic aid device in any suitable navigable environment.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

This detailed description is to be construed as examples and does not describe every possible embodiment, as describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method of providing visual aid to a person within a navigable environment. The method comprises, via one or more processors: receiving, via a computing device disposed within the navigable environment, an indication of an intent of a person to navigate within the navigable environment; determining a current location of the person within the navigable environment; determining, based upon the received indication of the navigation intent, a destination of the person within the navigable environment; determining, based upon the determination of the current location and destination, an activation arrangement comprising a determination of one or more visual aid devices to be activated within the navigable environment to guide the person from the current location to the destination; and causing activation of the one or more visual aid devices according to the activation arrangement.

2. The computer-implemented method of the previous aspect, further comprising, after determining the activation arrangement: continuously updating, via the one or more processors, the current location of the person while the person moves to the destination within the navigable environment, wherein causing the activation the one or more visual aid devices to activate according to the activation arrangement comprises causing each visual aid device of the one or more visual aid devices to activate based upon a determination that the visual aid device is within a predetermined proximity of the current location of the person.

3. The computer-implemented method of any one of the previous aspects, wherein the computing device disposed within the navigable environment comprises a biometric device, and wherein receiving the indication of the navigation intent via the one or more processors comprises: i) receiving biometric data obtained via the biometric device, and (ii) determining an identity of person within the navigable environment based upon received the biometric data.

4. The computer-implemented method of any one of the previous aspects, wherein identifying the current location of the person within the navigable environment comprises determining, via one or more wireless positioning devices, a location of a wireless communication device corresponding to the person.

5. The computer-implemented method of any one of the previous aspects, wherein identifying the current location of the person within the navigable environment comprises determining, via one or more wireless positioning devices, a location of a wireless communication device corresponding to the person.

6. The computer-implemented method of any one of the previous aspects, wherein determining the activation arrangement comprises determining one or more of an image, pattern, color, or lighting intensity to be displayed via the one or more visual aid devices.

7. The computer-implemented method of the previous aspect, wherein one or more of the image, pattern, color, or lighting intensity is determined based upon a determined identity of the person within the navigable environment.

8. The computer-implemented method of any one of the previous aspects, wherein determining the arrangement further comprises determining one or more audial aid devices to be activated within the navigable environment, and wherein the method further comprises causing the one or more audial aid devices to activate according to the activation arrangement to guide the person from the current location to the destination.

9. The computer-implemented method of any one of the previous aspects, wherein determining the arrangement further comprises determining one or more haptic aid devices to be activated within the navigable environment, and wherein the method further comprises causing the one or more haptic aid devices to activate according to the navigation pattern to guide the person from the current location to the destination.

10. The computer-implemented method of any one of the previous aspects, wherein the person within the navigable environment is a first person, and wherein the determined activation arrangement comprises a seatback unit corresponding to a second person located between the current location and the destination, and wherein causing activation of the one or more visual aid devices according to the activation arrangement comprises causing a visual alert to be displayed via the seatback unit to notify the second person of movement of the first person in the navigable environment.

11. The computer-implemented method of any one of the previous aspects, wherein the navigable environment is an aircraft cabin environment.

12. A computing system comprising one or more processors and one or more computer memories storing computer-executable instructions that, when executed via the one or more processors, cause the computing system to: receive, via a computing device disposed within the navigable environment, an indication of an intent of a person to navigate within the navigable environment; determine a current location of the person within the navigable environment; determine, based upon the received indication of the navigation intent, a destination of the person within the navigable environment; determine, based upon the determination of the current location and destination, an activation arrangement comprising one or more visual aid devices to be activated within the navigable environment to guide the person from the current location to the destination; and cause the one or more visual aid devices to activate according to the activation arrangement.

13. The computing system of the previous aspect, wherein the computer-executable instructions, when executed via the one or more processors, cause the computing system to: continuously update the current location of the person while the person moves to the destination within the navigable environment, wherein causing the activation the one or more visual aid devices to activate according to the activation arrangement comprises causing each visual aid device of the one or more visual aid devices to activate based upon a determination that the visual aid device is within a predetermined proximity of the current location of the person.

14. The computing system of any one of aspects 12-13, wherein the computing device disposed within the navigable environment comprises a biometric device, and wherein receiving the indication of the navigation intent via the one or more processors comprises: (i) receiving biometric data obtained via the biometric device; and (ii) determining an identity of the person within the navigable environment based upon the received biometric data.

15. The computing system of any one of aspects 12-14, wherein identifying the current location of the person within the navigable environment comprises determining, via one or more wireless positioning devices, a location of a wireless communication device corresponding to the person.

16. The computing system of any one of aspects 12-15, wherein the determination of the activation arrangement is based at least in part upon a determination of one or more environmental conditions within the navigable environment.

17. The computing system of any one of aspects 12-16, wherein determining the activation arrangement comprises determining one or more of an image, pattern, color, or lighting intensity to be displayed via the one or more visual aid devices.

18. The computing system of the previous aspect, wherein the one or more of the image, pattern, color, or lighting intensity is determined based upon a determined identity of the person within the navigable environment.

19. The computing system of any one of aspects 12-18, wherein the activation arrangement further comprises one or more audial aid devices to be activated within the navigable environment, and wherein the computer-executable instructions, when executed via the one or more processors, further cause the computing system to cause the one or more audial aid devices to activate according to the activation arrangement to guide the person from the current location to the destination.

20. The computing system of any one of aspects 12-19, herein the activation arrangement further comprises one or more haptic aid devices to be activated within the navigable environment, and wherein the computer-executable instructions, when executed via the one or more processors, further cause the computing system to cause the one or more haptic aid devices to activate according to the activation arrangement to guide the person from the current location to the destination.

21. The computing system of any one of aspects 12-20, wherein the person within the navigable environment is a first person, and wherein the determined activation arrangement comprises a seatback unit corresponding to a second person located between the current location and the destination, and wherein causing activation of the one or more visual aid devices according to the activation arrangement comprises causing a visual alert to be displayed via the seatback unit to notify the second person of movement of the first person in the navigable environment.

22. The computing system of any one of aspects 12-21, wherein the navigable environment is an aircraft cabin environment.

23. Any one of the above aspects in combination with any other one or more of the above aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method of providing visual aid to a first person within a navigable environment, the method comprising:
    receiving, at one or more processors, via a computing device disposed within the navigable environment, an indication of an intent of a first person to navigate to return to a seat assigned to the first person within the navigable environment;
    determining, via the one or more processors, a current location of the first person within the navigable environment;
    determining, via the one or more processors, based upon the received indication of the navigation intent, a destination corresponding to the assigned seat of the first person within the navigable environment;
    determining, via the one or more processors, based upon the determination of the current location and destination, an activation arrangement comprising a determination of one or more visual aid devices to be activated within the navigable environment to guide the first person from the current location to the destination;
    causing, via the one or more processors, activation of the one or more visual aid devices according to the activation arrangement; and
    causing an activation of a personal computing device or seatback unit of a second person in the navigable environment to display a notification to the second person to notify the second person of movement of the first person to the assigned seat in the navigable environment.

2. The computer-implemented method of claim 1, wherein the one or more visual aid device in the navigation arrangement include a plurality of visual aid devices installed in the navigable environment.

3. The computer-implemented method of claim 1, further comprising, after determining the activation arrangement:
    continuously updating, via the one or more processors, the current location of the first person while the first person moves to the destination within the navigable environment,
    wherein causing the activation the one or more visual aid devices to activate according to the activation arrangement comprises causing each visual aid device of the one or more visual aid devices to activate based upon a determination that the visual aid device is within a predetermined proximity of the current location of the first person.

4. The computer-implemented method of claim 1, wherein the computing device disposed within the navigable environment comprises a biometric device, and wherein receiving the indication of the navigation intent via the one or more processors comprises:
    (i) receiving biometric data obtained via the biometric device, and
    (ii) determining an identity of the first person within the navigable environment based upon received the biometric data.

5. The computer-implemented method of claim 1, wherein identifying the current location of the first person within the navigable environment comprises determining, via one or more wireless positioning devices, a location of a wireless communication device corresponding to the first person.

6. The computer-implemented method of claim 1, wherein the determination of the activation arrangement is based at least in part upon a determination of one or more environmental conditions within the navigable environment.

7. The computer-implemented method of claim 1, wherein determining the activation arrangement comprises determining, from among a plurality of mutually exclusive images, patterns or colors to be used for marking respective paths for respective persons in the navigable environment, one or more images, patterns, or colors to be displayed via the one or more visual aid devices.

8. The computer-implemented method of claim 7, wherein the one or more images, patterns, or colors are determined based upon a determined identity of the first person within the navigable environment.

9. The computer-implemented method of claim 1, wherein determining the arrangement further comprises determining one or more audial aid devices to be activated within the navigable environment, and wherein the method further comprises causing the one or more audial aid devices to activate according to the activation arrangement to guide the first person from the current location to the destination.

10. The computer-implemented method of claim 1, wherein determining the arrangement further comprises determining one or more haptic aid devices to be activated within the navigable environment, and wherein the method further comprises causing the one or more haptic aid devices to activate according to the activation arrangement to guide the first person from the current location to the destination.

11. A computing system comprising:
    one or more processors; and
    one or more computer memories storing computer-executable instructions that, when executed via the one or more processors, cause the computing system to:
    receive, via a computing device disposed within a navigable environment, an indication of an intent of a first person to navigate to return to a seat assigned to the first person within the navigable environment;
    determine a current location of the first person within the navigable environment;
    determine, based upon the received indication of the navigation intent, a destination corresponding to the assigned seat of the first person within the navigable environment;
    determine, based upon the determination of the current location and destination, an activation arrangement comprising one or more visual aid devices to be activated within the navigable environment to guide the first person from the current location to the destination;
    cause the one or more visual aid devices to activate according to the activation arrangement, and
    cause an activation of a personal computing device or seatback unit of a second person in the navigable environment to display a notification to the second person to notify the second person of movement of the first person to the assigned seat in the navigable environment.

12. The computing system of claim 11, wherein the one or more visual aid device in the navigation arrangement include a plurality of visual aid devices installed in the navigable environment.

13. The computing system of claim 11, wherein the computer-executable instructions, when executed via the one or more processors, cause the computing system to:
continuously update the current location of the first person while the first person moves to the destination within the navigable environment,
wherein causing the activation the one or more visual aid devices to activate according to the activation arrangement comprises causing each visual aid device of the one or more visual aid devices to activate based upon a determination that the visual aid device is within a predetermined proximity of the current location of the first person.

14. The computing system of claim 11, wherein the computing device disposed within the navigable environment comprises a biometric device, and wherein receiving the indication of the navigation intent via the one or more processors comprises:
(i) receiving biometric data obtained via the biometric device; and
(ii) determining an identity of the first person within the navigable environment based upon the received biometric data.

15. The computing system of claim 11, wherein identifying the current location of the first person within the navigable environment comprises determining, via one or more wireless positioning devices, a location of a wireless communication device corresponding to the first person.

16. The computing system of claim 11, wherein the determination of the activation arrangement is based at least in part upon a determination of one or more environmental conditions within the navigable environment.

17. The computing system of claim 11, wherein determining the activation arrangement comprises determining, from among a plurality of mutually exclusive images, patterns or colors to be used for marking respective paths for respective persons in the navigable environment, one or more images, patterns, or colors to be displayed via the one or more visual aid devices.

18. The computing system of claim 17, wherein the one or more images, patterns, or colors are determined based upon a determined identity of the first person within the navigable environment.

19. The computing system of claim 11, wherein the activation arrangement further comprises one or more audial aid devices to be activated within the navigable environment, and wherein the computer-executable instructions, when executed via the one or more processors, further cause the computing system to cause the one or more audial aid devices to activate according to the activation arrangement to guide the first person from the current location to the destination.

20. The computing system of claim 11, wherein the activation arrangement further comprises one or more haptic aid devices to be activated within the navigable environment, and
wherein the computer-executable instructions, when executed via the one or more processors, further cause the computing system to cause the one or more haptic aid devices to activate according to the activation arrangement to guide the first person from the current location to the destination.

* * * * *